(12) United States Patent
Kasatani

(10) Patent No.: US 8,243,312 B2
(45) Date of Patent: Aug. 14, 2012

(54) NETWORK SYNCHRONIZING SYSTEM AND INFORMATION PROCESSING APPARATUS

(75) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 682 days.

(21) Appl. No.: 12/382,470

(22) Filed: Mar. 17, 2009

(65) Prior Publication Data

US 2009/0237715 A1 Sep. 24, 2009

(30) Foreign Application Priority Data

Mar. 18, 2008 (JP) ................................. 2008-070381
Oct. 28, 2008 (JP) ................................. 2008-277110

(51) Int. Cl.
*G06F 3/12* (2006.01)
(52) U.S. Cl. ...................................... 358/1.15; 717/169
(58) Field of Classification Search ........................ None
See application file for complete search history.

(56) References Cited

U.S. PATENT DOCUMENTS

| 7,484,206 | B2 * | 1/2009 | Drouet et al. ................. 717/169 |
| 2004/0260953 | A1 | 12/2004 | Jamieson et al. |
| 2005/0012953 | A1 | 1/2005 | Fujishige et al. |
| 2007/0046976 | A1 | 3/2007 | Kasatani |
| 2007/0046977 | A1 | 3/2007 | Kasatani |
| 2007/0046988 | A1 | 3/2007 | Kasatani |
| 2007/0047847 | A1 | 3/2007 | Kasatani |
| 2007/0050378 | A1 | 3/2007 | Kasatani |
| 2007/0050460 | A1 | 3/2007 | Kasatani |
| 2007/0182982 | A1 | 8/2007 | Hayashida et al. |
| 2007/0216943 | A1 * | 9/2007 | Funamizu .................... 358/1.15 |
| 2008/0016582 | A1 | 1/2008 | Morimoto |
| 2008/0163335 | A1 * | 7/2008 | Hagstrom ......................... 726/1 |
| 2008/0297833 | A1 * | 12/2008 | Hatakeyama ................ 358/1.15 |
| 2009/0006652 | A1 | 1/2009 | Kasatani |
| 2009/0007232 | A1 | 1/2009 | Kasatani |

FOREIGN PATENT DOCUMENTS

| JP | 2007-067830 | 3/2007 |
| JP | 2007-169792 | 5/2007 |

OTHER PUBLICATIONS

Extended European search report dated Jun. 19, 2009, for corresponding Application No. 09155402.2-2413.

* cited by examiner

*Primary Examiner* — Twyler Haskins
*Assistant Examiner* — Helen Q Zong
(74) *Attorney, Agent, or Firm* — Harness, Dickey & Pierce, P.L.C.

(57) ABSTRACT

A network synchronizing system includes plural apparatuses. A first apparatus includes a first recording unit to record personal data of one or more users who can use the first apparatus to share the personal data with other apparatuses. A second apparatus includes a first setting unit to record personal data of one or more users who can use the second apparatus; and a first control unit to compare the personal data recorded in the first setting unit and the first recording unit and update the personal data recorded in the first setting unit of the second apparatus with the latest personal data for each user. The first control unit determines that users are the same user when data uniquely provided for the users in the personal data recorded in the first setting unit and the first recording unit are the same.

10 Claims, 31 Drawing Sheets

FIG.3

PERSONAL SETTING DATA

| USER ID (UNIQUE) | 01a |
|---|---|
| PRONUNCIATION | TARO RICOH |
| GROUP | DEVELOPMENT DIVISION |
| PERSONAL NAME (UNIQUE) | TARO RICOH |
| USER NAME (UNIQUE) | TARO |
| PASSWORD | XXXXX |
| IC CARD NUMBER | 001 |
| WINDOWS USER NAME | TARO |
| WINDOWS PASSWORD | ☐☐☐☐☐ |

FIG.4A

REGISTERED USER DATA

| USER ID | USER NAME | PERSONAL NAME | LAST LOGIN DATE AND TIME | LAST UPDATE DATE AND TIME | IC CARD NUMBER | PERSONAL SETTING FILE |
|---|---|---|---|---|---|---|
| 01a | TARO | TARO RICOH | 1/10 | 1/12 | 001 | 01a |
| 02a | JIRO | JIRO RICOH | 1/10 | 1/12 | 002 | 02a |
| 03a | SABURO | SABURO RICOH | 1/10 | 1/12 | 003 | 03a |

FIG.4B

DELETED USER DATA

| USER ID | DELETED DATE AND TIME |
|---------|----------------------|
| 04a     | 1/9                  |
| 05a     | 1/11                 |
|         |                      |
|         |                      |
|         |                      |

FIG.4C

IDENTICAL USER DATA

| GUID | USER ID |
|------|---------|
| A01  | 01a     |
| A02  | 02a     |
| A03  | 03a     |
| A04  | 04a     |
| A05  | 05a     |
| A01  | 01b     |
| A02  | 02b     |
| A03  | 03b     |
| A04  | 04b     |
| A05  | 05b     |

FIG.4D

AUTHENTICATION USER DATA

| USER ID | REMOTE USER ID |
|---------|----------------|
| 01a     | 01b            |
| 02a     | 02b            |
| 03a     | 03b            |
| 04a     | 04b            |
| 05a     | 05b            |

FIG.5

SYNCHRONIZATION SETTING DATA

LAST UPDATE DATE AND TIME SETTING

| LAST UPDATE DATE AND TIME | AT 12 : 34 ON MAY 6TH |
|---|---|

NETWORK SYNCHRONIZATION SETTING

| NETWORK SYNCHRONIZATION (YES OR NO) | YES |
|---|---|
| RELEASE SYNCHRONIZING COMMON FOLDER (YES OR NO) | YES |
| NETWORK PATH | /*/* |
| LOGIN USER NAME | TARO |
| LOGIN PASSWORD | XXXXX |
| AUTOMATIC SYNCHRONIZATION INTERVAL | 24 HOURS |

FIG.7

MULTIFUNCTION PERIPHERAL 2b

REGISTERED USER DATA

| USER ID | USER NAME | PERSONAL SETTING FILE |
|---------|-----------|----------------------|
| 01b | TARO | File01b |
| 02b | JIRO | File02b |

DELETED USER DATA

| USER ID | DELETED DATE AND TIME |
|---------|----------------------|
| | |
| | |

IDENTICAL USER DATA

| GUID | USER ID |
|------|---------|
| | |
| | |

AUTHENTICATION USER DATA

| USER ID | REMOTE USER ID |
|---------|----------------|
| | |
| | |

MULTIFUNCTION PERIPHERAL 2a

REGISTERED USER DATA

| USER ID | USER NAME | PERSONAL SETTING FILE |
|---------|-----------|----------------------|
| 01a | TARO | File01a |

DELETED USER DATA

| USER ID | DELETED DATE AND TIME |
|---------|----------------------|
| | |
| | |

IDENTICAL USER DATA

| GUID | USER ID |
|------|---------|
| | |
| | |

AUTHENTICATION USER DATA

| USER ID | REMOTE USER ID |
|---------|----------------|
| | |
| | |

FIG.8

MULTIFUNCTION PERIPHERAL 2b

REGISTERED USER DATA

| USER ID | USER NAME | PERSONAL SETTING FILE |
|---|---|---|
| 01b | TARO | File01b |
| 02b | JIRO | File02b |

IDENTICAL USER DATA

| GUID | USER ID |
|---|---|
| A01 | 01b |
| A01 | 01a |

DELETED USER DATA

| USER ID | DELETED DATE AND TIME |
|---|---|
| | |
| | |

AUTHENTICATION USER DATA

| USER ID | REMOTE USER ID |
|---|---|
| | |
| | |

MULTIFUNCTION PERIPHERAL 2a

REGISTERED USER DATA

| USER ID | USER NAME | PERSONAL SETTING FILE |
|---|---|---|
| 01a | TARO | File01b |
| 02b | JIRO | File02b |

IDENTICAL USER DATA

| GUID | USER ID |
|---|---|
| | |
| | |

DELETED USER DATA

| USER ID | DELETED DATE AND TIME |
|---|---|
| | |
| | |

AUTHENTICATION USER DATA

| USER ID | REMOTE USER ID |
|---|---|
| 01a | 01b |
| | |

FIG.13

MULTIFUNCTION PERIPHERAL 2b

REGISTERED USER DATA

| USER ID | USER NAME | LAST UPDATE DATE AND TIME | PERSONAL SETTING FILE |
|---------|-----------|---------------------------|------------------------|
| 03b     | SABURO    | 1/19                      | File03b                |
| 04b     | SHIRO     | 1/17                      | File04b                |

DELETED USER DATA

| USER ID | DELETED DATE AND TIME |
|---------|------------------------|
|         |                        |
|         |                        |

IDENTICAL USER DATA

| GUID | USER ID |
|------|---------|
|      |         |
|      |         |

AUTHENTICATION USER DATA

| USER ID | REMOTE USER ID |
|---------|-----------------|
|         |                 |
|         |                 |

MULTIFUNCTION PERIPHERAL 2a

REGISTERED USER DATA

| USER ID | USER NAME | LAST UPDATE DATE AND TIME | PERSONAL SETTING FILE |
|---------|-----------|---------------------------|------------------------|
| 03a     | SABURO    | 1/18                      | File03a                |
| 04a     | SHIRO     | 1/18                      | File04a                |

DELETED USER DATA

| USER ID | DELETED DATE AND TIME |
|---------|------------------------|
|         |                        |
|         |                        |

IDENTICAL USER DATA

| GUID | USER ID |
|------|---------|
|      |         |
|      |         |

AUTHENTICATION USER DATA

| USER ID | REMOTE USER ID |
|---------|-----------------|
|         |                 |
|         |                 |

FIG.14

MULTIFUNCTION PERIPHERAL 2b

REGISTERED USER DATA

| USER ID | USER NAME | LAST UPDATE DATE AND TIME | PERSONAL SETTING FILE |
|---|---|---|---|
| 03b | SABURO | 1/19 | File03b |
| 04b | SHIRO | 1/18 | File04a |

DELETED USER DATA

| USER ID | DELETED DATE AND TIME |
|---|---|
|  |  |
|  |  |
|  |  |

IDENTICAL USER DATA

| GUID | USER ID |
|---|---|
| A03 | 03b |
| A03 | 03a |
| A04 | 04b |
| A04 | 04a |

AUTHENTICATION USER DATA

| USER ID | REMOTE USER ID |
|---|---|
|  |  |
|  |  |
|  |  |

MULTIFUNCTION PERIPHERAL 2a

REGISTERED USER DATA

| USER ID | USER NAME | LAST UPDATE DATE AND TIME | PERSONAL SETTING FILE |
|---|---|---|---|
| 03a | SABURO | 1/19 | File03b |
| 04a | SHIRO | 1/18 | File04a |

DELETED USER DATA

| USER ID | DELETED DATE AND TIME |
|---|---|
|  |  |
|  |  |
|  |  |

IDENTICAL USER DATA

| GUID | USER ID |
|---|---|
|  |  |
|  |  |
|  |  |
|  |  |

AUTHENTICATION USER DATA

| USER ID | REMOTE USER ID |
|---|---|
| 03a | 03b |
| 04a | 04b |
|  |  |

FIG.15

MULTIFUNCTION PERIPHERAL 2b

REGISTERED USER DATA

| USER ID | USER NAME | LAST LOGIN DATE AND TIME | LAST UPDATE DATE AND TIME | PERSONAL SETTING FILE |
|---|---|---|---|---|

DELETED USER DATA

| USER ID | DELETED DATE AND TIME |
|---|---|
| 03b | 1/16 |
| 04b | 1/16 |

IDENTICAL USER DATA

| GUID | USER ID |
|---|---|
| A03 | 03b |
| A03 | 03a |
| A04 | 04b |
| A04 | 04a |

AUTHENTICATION USER DATA

| USER ID | REMOTE USER ID |
|---|---|

---

MULTIFUNCTION PERIPHERAL 2a

REGISTERED USER DATA

| USER ID | USER NAME | LAST LOGIN DATE AND TIME | LAST UPDATE DATE AND TIME | PERSONAL SETTING FILE |
|---|---|---|---|---|
| 03a | SABURO | 1/17 | 1/19 | File03b |
| 04a | SHIRO | 1/15 | 1/18 | File04a |

DELETED USER DATA

| USER ID | DELETED DATE AND TIME |
|---|---|

IDENTICAL USER DATA

| GUID | USER ID |
|---|---|

AUTHENTICATION USER DATA

| USER ID | REMOTE USER ID |
|---|---|
| 03a | 03b |
| 04a | 04b |

FIG.16

MULTIFUNCTION PERIPHERAL 2b

REGISTERED USER DATA

| USER ID | USER NAME | LAST LOGIN DATE AND TIME | LAST UPDATE DATE AND TIME | PERSONAL SETTING FILE |
|---|---|---|---|---|
| 03a | SABURO | 1/17 | 1/19 | File03b |

DELETED USER DATA

| USER ID | DELETED DATE AND TIME |
|---|---|
| 04b | 1/16 |

IDENTICAL USER DATA

| GUID | USER ID |
|---|---|
| A03 | 03b |
| A03 | 03a |
| A04 | 04b |
| A04 | 04a |

AUTHENTICATION USER DATA

| USER ID | REMOTE USER ID |
|---|---|
| | |
| | |

MULTIFUNCTION PERIPHERAL 2a

REGISTERED USER DATA

| USER ID | USER NAME | LAST LOGIN DATE AND TIME | LAST UPDATE DATE AND TIME | PERSONAL SETTING FILE |
|---|---|---|---|---|
| 03a | SABURO | 1/17 | 1/19 | File03b |

DELETED USER DATA

| USER ID | DELETED DATE AND TIME |
|---|---|
| | |

IDENTICAL USER DATA

| GUID | USER ID |
|---|---|
| | |
| | |

AUTHENTICATION USER DATA

| USER ID | REMOTE USER ID |
|---|---|
| 03a | 03b |
| 04a | 04b |

FIG.18

SYNCHRONIZATION SETTING DATA

LAST UPDATE DATE AND TIME SETTING

| LAST UPDATE DATE AND TIME | AT 12 : 34 ON MAY 6TH |
|---|---|

NETWORK SYNCHRONIZATION SETTING

| NETWORK SYNCHRONIZATION (YES OR NO) | YES |
|---|---|
| RELEASE SYNCHRONIZING COMMON FOLDER (YES OR NO) | YES |
| NETWORK PATH | /*/* |
| LOGIN USER NAME | TARO |
| LOGIN PASSWORD | XXXXX |
| AUTOMATIC SYNCHRONIZATION INTERVAL | 24 HOURS |

SETTING RELATED TO UPDATE DATA

| AUTOMATIC DOWNLOAD (YES OR NO) | YES |
|---|---|
| DOWNLOAD METHOD (VIA DOWNLOAD SERVER, VIA NETWORK SYNCHRONIZATION) | VIA NETWORK SYNCHRONIZATION |
| AUTOMATIC EXECUTION INTERVAL | 24 HOURS |
| AUTOMATIC UPDATE (YES OR NO) | NO |
| MANUAL UPDATE (YES OR NO) | YES |
| SELECT VERSION (SELECT FROM DOWNLOADED VERSIONS) | |
| REFLECT VERSION SELECTION TO NETWORK SYNCHRONIZATION (YES OR NO) | NO |
| NOTIFY DOWNLOAD/UPDATE BY EMAIL (YES OR NO) | YES |
| TITLE | * * * * |
| TEXT | * * * * |

SETTING RELATED TO AUTOMATIC REBOOT

| AUTOMATIC REBOOT (YES OR NO) | YES |
|---|---|
| AUTOMATIC REBOOT TIME | 04:00 |

IMAGE FORMATION

SEND FILE

FILE NAME/TITLE: BBB

RECORD

DOCUMENT NAME: CCC
(CATEGORY NAME)

FIG.26

| MULTIFUNCTION PERIPHERAL | SYNCHRONIZATION COMMON FOLDER ADDRESS (PATH) | RELEASE SYNCHRONIZATION COMMON FOLDER (YES OR NO) | NETWORK PATH |
|---|---|---|---|
| MULTIFUNCTION PERIPHERAL 2a | /2a/*** | YES | /2b/*** |
| MULTIFUNCTION PERIPHERAL 2b | /2b/*** | YES | NONE |
| MULTIFUNCTION PERIPHERAL 2c | /2c/*** | YES | /2b/*** |
| MULTIFUNCTION PERIPHERAL 2d | /2d/*** | NO | /2a/*** |
| MULTIFUNCTION PERIPHERAL 2e | /2e/*** | NO | /2a/*** |
| MULTIFUNCTION PERIPHERAL 2f | /2f/*** | NO | /2c/*** |
| MULTIFUNCTION PERIPHERAL 2g | /2g/*** | NO | /2c/*** |

FIG.28

SYNCHRONIZATION SETTING DATA

| LAST UPDATE DATE AND TIME SETTING | |
|---|---|
| LAST UPDATE DATE AND TIME | AT 12 : 34 ON MAY 6TH |

NETWORK SYNCHRONIZATION SETTING

| | |
|---|---|
| NETWORK SYNCHRONIZATION (YES OR NO) | YES |
| RELEASE SYNCHRONIZING COMMON FOLDER (YES OR NO) | YES |
| NETWORK PATH | /2b/*** |
| LOGIN USER NAME | TARO |
| LOGIN PASSWORD | XXXXX |
| AUTOMATIC SYNCHRONIZATION INTERVAL | 24 HOURS |

FIG.29

| LAST UPDATE DATE AND TIME SETTING | |
|---|---|
| LAST UPDATE DATE AND TIME | AT 12:34 ON MAY 6TH |

| NETWORK SYNCHRONIZATION SETTING | |
|---|---|
| NETWORK SYNCHRONIZATION (YES OR NO) | YES |
| RELEASE SYNCHRONIZING COMMON FOLDER (YES OR NO) | YES |
| NETWORK PATH | /2b/*** |
| LOGIN USER NAME | TARO |
| LOGIN PASSWORD | XXXXX |
| AUTOMATIC SYNCHRONIZATION INTERVAL | 24 HOURS |

| PLURAL SYNCHRONIZATION SETTING | |
|---|---|
| SYNCHRONIZE WITH PLURAL SYNCHRONIZATION COMMON FOLDERS (YES OR NO) | YES |
| NETWORK PATH | /2c/*** |
| LOGIN USER NAME | JIRO |
| LOGIN PASSWORD | XXXXX |
| AUTOMATIC SYNCHRONIZATION INTERVAL | 24 HOURS |

NETWORK SYNCHRONIZING SYSTEM AND INFORMATION PROCESSING APPARATUS

BACKGROUND OF THE INVENTION

1. Field of the Invention

The present invention generally relates to a network synchronizing system and an information processing apparatus.

2. Description of the Related Art

In recent years, there have been information processing systems having an information processing apparatus which is connected to a network, manages plural communication protocols, and is capable of communicating documents in various data forms with plural information apparatuses.

Such an information processing system provides various application services by using the information processing apparatus as a core component. The various application services include, for example, sending data of a read document image or data formed by an information apparatus to a specified address by an email, sending such data by facsimile, a process to transfer a file with the information apparatus, recording and outputting text data of a received email and an attached image, and the like, sending such data to a specified facsimile machine, transferring a file to the information apparatus, and storing and managing the data in the information processing apparatus.

However, such an information processing apparatus is required to be connected to plural information apparatuses through a network. In particular, when there are plural independent apparatuses that require authentications in the network, and they identify individuals and provide a function usable by only a registered user, it has been inconvenient since a user name and a password have to be inputted to each apparatus. Further, when the systems are integrated, a user name and a password can be commonly used, however, there has been a problem in that a vast amount of resources have been required for such system construction for unifying management of authentication data which have been individually managed.

Patent Document 1 solves the above problem by a network communication system constituted by a document input-output apparatus that identifies individuals by an authentication using an operating unit and provides a function usable by only a registered user, and plural external apparatuses connected through a network, which identify individuals by protocols used in the network to provide a function.

Moreover, according to Patent Document 1, an external apparatus authentication compatible document input-output apparatus is provided, by which authentications of individually provided authentication units are performed by one authentication using an operating unit, thereby the external apparatuses are automatically authenticated.

Patent Document 1: Japanese Patent Application Publication No. 2007-67830 Now, a network communication system is constituted by plural information processing apparatuses such as the document input-output apparatus disclosed in Patent Document 1. In this case, it is preferable that setting data such as user data registered in the information processing apparatuses be commonly used (synchronized) among the plural information processing apparatuses in order to, for example, constitute a network communication system, in which people of a predetermined group of a company share the plural information processing apparatuses.

However, conventionally, there has been a problem in that a vast amount of resources are required to achieve such an object, for example, to constitute a system for unifying management of setting data which are individually set in the apparatuses.

SUMMARY OF THE INVENTION

The present invention has been made in light of the above circumstances to solve the above problem. It is an object of at least one embodiment of the present invention to provide a network synchronizing system and an information processing apparatus, by which setting data are effectively synchronized between plural information processing apparatuses.

According to one aspect of the present invention, a network synchronizing system including plural information processing apparatuses is provided. A first information processing apparatus of the plural information processing apparatuses includes a first synchronization common recording unit to record personal setting data of one or more registered users who can use the first information processing apparatus so as to share the personal setting data with one or more of other information processing apparatuses of the plural information processing apparatuses. A second information processing apparatus of the plural information processing apparatuses includes a first setting data unit to record personal setting data of one or more registered users who can use the second information processing apparatus; and a first synchronization control unit to compare the personal setting data recorded in the first setting data unit of the first information processing apparatus and the personal setting data recorded in the first synchronization common recording unit and update the personal setting data recorded in the first setting data unit of the second information processing apparatus with the latest personal setting data for each user. The first synchronization control unit determines that a predetermined user having personal setting data recorded in the first setting data unit and a predetermined user having personal setting data recorded in the first synchronization common recording unit are the same user, when data uniquely provided for the predetermined user in the personal setting data of the predetermined user recorded in the first setting data unit and data uniquely provided for the predetermined user in the personal setting data of the predetermined user recorded in the first synchronization common recording unit are the same.

According to another aspect of the present invention, a network synchronizing system including plural information processing apparatuses and a recording apparatus is provided. The recording apparatus includes a synchronization common recording unit to record personal setting data of one or more registered users who can use one of the plural information processing apparatuses so as to share the personal setting data with one or more of other information processing apparatuses of the plural information processing apparatuses. A first information processing apparatus of the plural information processing apparatuses includes a first setting data unit to record personal setting data of one or more registered users who can use the first information processing apparatus; and a first synchronization control unit to compare the personal setting data of the one or more users recorded in the first setting data unit and the personal setting data of the one or more users recorded in the synchronization common recording unit of the recording apparatus and update the personal setting data of the one or more users recorded in the first setting data unit with the latest setting data for each user. A second information processing apparatus of the plural information processing apparatuses includes a second setting data unit to record personal setting data of one or more registered users who can use the second information processing apparatus. A second synchronization control unit to compare the personal setting data of the one or more users recorded in the second setting data unit and the personal setting data of the one or more users recorded in the synchronization common recording unit of the recording apparatus and update the personal setting data of the one or more users recorded in the second setting data unit with the latest personal setting data for each user. The first or second synchronization control unit determines that a predetermined user having personal setting data recorded in the first or second setting data unit and a predetermined user having personal setting data recorded in the synchronization common recording unit of the recording apparatus are the same user, when data uniquely provided for the predetermined user in the personal setting data of the predetermined user recorded in the first or second setting data unit and data uniquely provided for the predetermined user in the personal setting data of the predetermined user recorded in the synchronization common recording unit of the recording apparatus are the same.

According to another aspect of the present invention, an information processing apparatus in a network synchronizing system formed of plural information processing apparatuses is provided. The plural information processing apparatuses include a first information processing apparatus having a first synchronization common recording unit to record personal setting data of one or more registered users who can use the first information processing apparatus so as to share the personal setting data with one or more of other information processing apparatuses of the plural information processing apparatuses. The information processing apparatus includes a first setting data unit to record personal setting data of one or more registered users who can use the information processing apparatus; and a first synchronization control unit to compare the personal setting data of the one or more users recorded in the first setting data unit and the personal setting data of the one or more users recorded in the first synchronization common recording unit and update the personal setting data of the one or more users recorded in the first setting data unit with the latest personal setting data for each user. The first synchronization control unit determines that a predetermined user having personal setting data recorded in the first setting data unit and a predetermined user having personal setting data recorded in the first synchronization common recording unit are the same user when data uniquely provided for the predetermined user in the personal setting data of the predetermined user recorded in the first setting data unit and data uniquely provided for the predetermined user in the predetermined setting data of the predetermined user recorded in the first synchronization common recording unit are the same.

BRIEF DESCRIPTION OF THE DRAWINGS

FIG. 3 is a (first) example of setting data as an object of network synchronization;

FIGS. 4A to 4D are (second) examples of setting data as an object of network synchronization;

FIG. 5 is a diagram showing an example of synchronization setting data for network synchronization;

FIG. 7 is an example of setting data of multifunction peripherals 2a and 2b before network synchronization;

FIG. 8 is an example of setting data of multifunction peripherals 2a and 2b after network synchronization;

FIG. 13 is a diagram showing an example of setting data of multifunction peripherals 2a and 2b before network synchronization according to a deformation example 1;

FIG. 14 is a diagram showing an example of setting data of multifunction peripherals 2a and 2b after network synchronization according to the deformation example 1;

FIG. 15 is a diagram showing an example of setting data of multifunction peripherals 2a and 2b before network synchronization according to a deformation example 2;

FIG. 16 is a diagram showing an example of setting data of multifunction peripherals 2a and 2b after network synchronization according to the deformation example 2;

FIG. 18 is a diagram showing an example of synchronization setting data for network synchronization;

FIG. 26 is a diagram showing an example of setting data pertaining to releasing of a synchronization common folder and a network path of a multifunction peripheral 2;

FIG. 28 is a diagram showing an example of synchronization setting data for network synchronization; and FIG. 29 is a diagram showing an example of synchronization setting data according to a deformation example for network synchronization.

DETAILED DESCRIPTION OF THE PREFERRED EMBODIMENTS

Below, embodiments of the present invention are described with reference to the drawings. In the embodiments, an example is described of applying an information processing apparatus of the present invention to a so-called multifunction peripheral having multi-functions such as a copying function, a facsimile (FAX) function, a printing function, a scanning function, and a function to send an input image (document image read by the scanning function or image inputted by the printing function or facsimile function). Note that the present invention is not limited to the multifunction peripheral, and can be applied to other general purpose computer apparatuses and the like.

[First Embodiment]

A first embodiment of the present invention is described below with reference to FIGS. 1 to 11.

(System Configuration Example)

Figure 1:
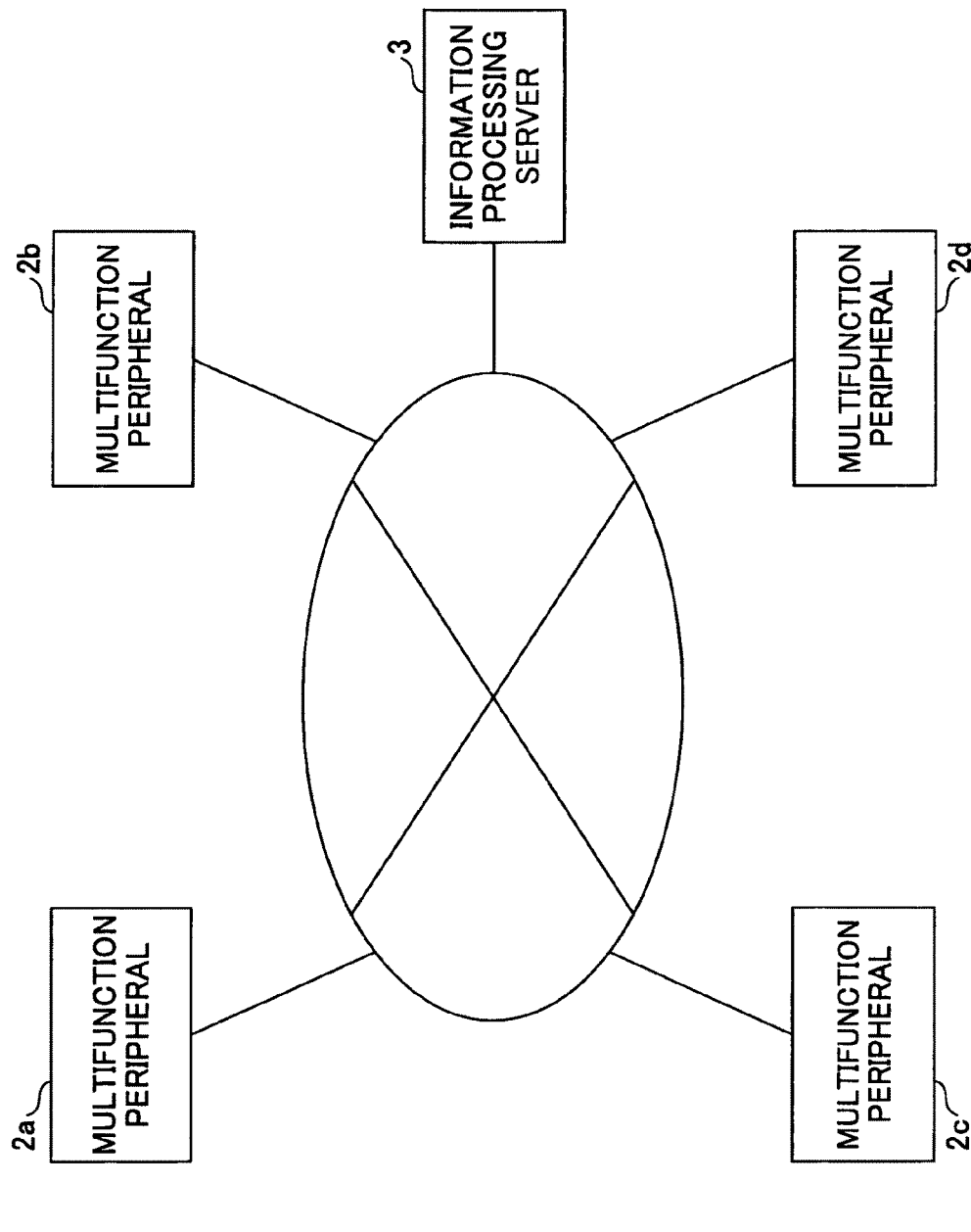
FIG. 1 is a diagram showing a configuration example of a network synchronizing system of a first embodiment.

FIG. 1 is a diagram showing a configuration example of a network synchronizing system of the first embodiment. In FIG. 1, a network synchronizing system 1 includes plural multifunction peripherals 2a 2b 2c and 2d (referred to as "multifunction peripheral 2" when one of the multifunction peripherals is specified) connected through a network such as a LAN (Local Area Network), an information processing server 3, and the like.

The multifunction peripheral 2 is an image processing apparatus having multi-functions such as a copying function, a facsimile (FAX) function, a printing function, a scanning function, and a function to send an input image (document image read by the scanning function or image inputted by the printing function or facsimile function).

The information processing server 3 is a computer apparatus which has a function as a user data managing server that unifies management of user data such as user names and passwords of users who use the network synchronizing system 1, and obtains various data such as antivirus definition data from an external apparatus which is not shown. In accordance with the intended use, plural information processing servers may be provided.

The network synchronizing system 1 of the first embodiment, with the above configuration, effectively synchronizes setting data of apparatuses among the plural multifunction peripherals 2 (hereinafter, synchronization in the present invention is referred to as "network synchronization").

(Configuration Example of Functions Related to Network Synchronization of Setting Data)

Figure 2:
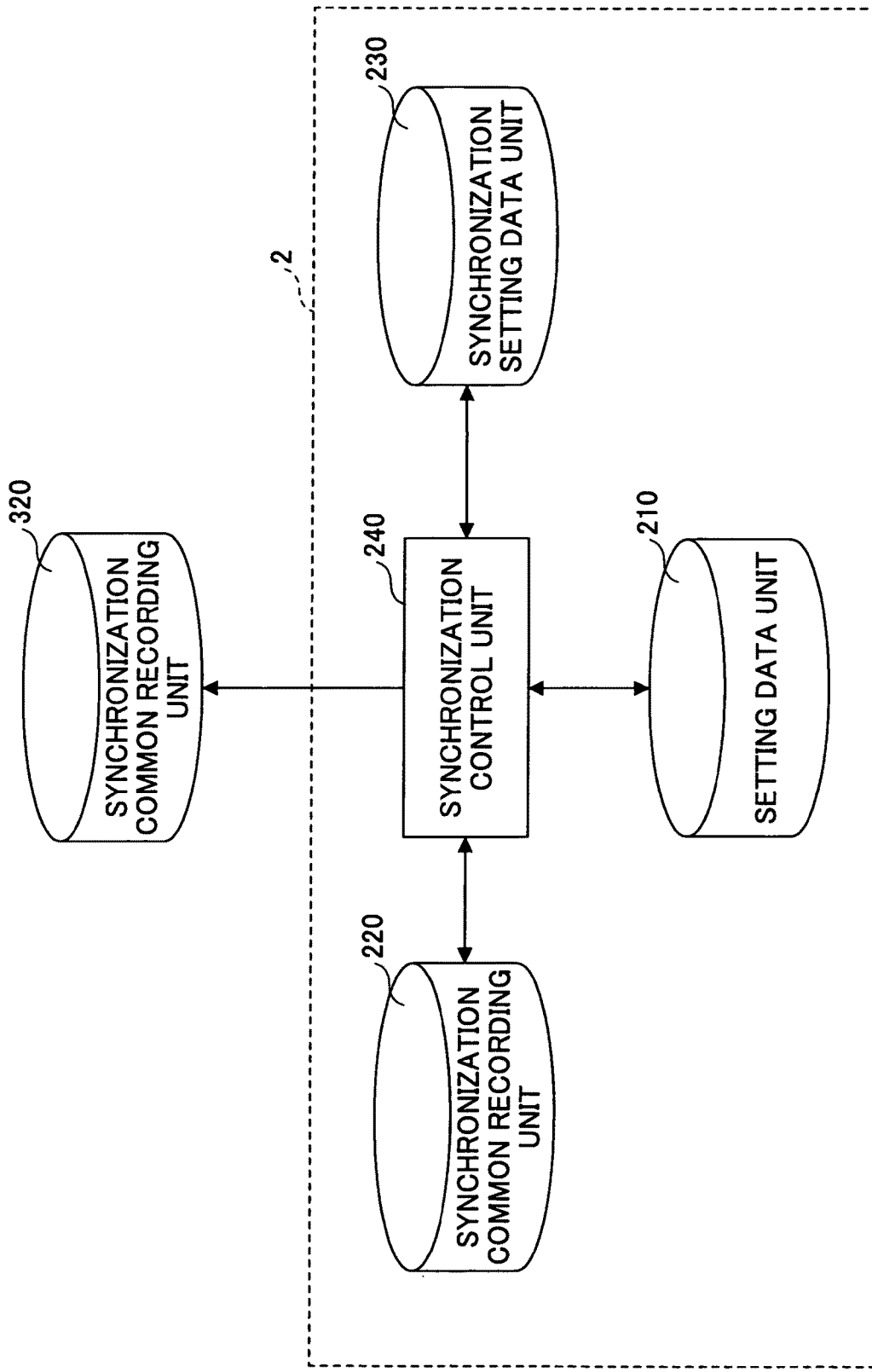
FIG. 2 is a block diagram showing a configuration example of functions of a multifunction peripheral of the first embodiment.

FIG. 2 is a block diagram showing a configuration example of functions related to network synchronization of setting data of the multifunction peripherals. In FIG. 2, the multifunction peripheral 2 includes a setting data unit 210, a synchronization common recording unit 220, a synchronization setting data unit 230, a synchronization control unit 240, and the like.

The setting data unit 210 is, for example, a recording device for recording setting data of the multifunction peripheral 2. In particular, the setting data here indicate setting data (personal setting data) of each registered user who can use the multifunction peripheral 2, however, the setting data unit 210 is not limited to this. Specific examples are described with reference to FIGS. 3 and 4 below.

The synchronization common recording unit 220 is, for example, a recording device for recording setting data as an object of network synchronization in the network synchronizing system 1. The setting data as the object of the network synchronization are, for example, setting data recorded in the setting data unit 210. The synchronization common recording unit 220 duplicates these data and records the duplicated data. When a setting of "YES" is made in "release synchronization common folder (the same as the synchronization common recording unit)" by the synchronization setting data unit 230, which is described below, another multifunction peripheral that is different from the multifunction peripheral 2 can access the synchronization common recording unit 220 of the multifunction peripheral 2. In other words, when a setting of "YES" is made in "release synchronization common folder" in another multifunction peripheral having the synchronization common recording unit 320, the multifunction peripheral 2 can obtain setting data of the multifunction peripheral which has released the synchronization common folder by accessing the synchronization common recording unit 320.

The synchronization setting data unit 230 is, for example, a recording device for recording synchronization setting data corresponding to setting data related to an operation of the network synchronization and the like. An example of the synchronization setting data is described below with reference to FIG. 5.

The synchronization control unit 240 performs various controls related to the network synchronization, based on the synchronization setting data recorded in the synchronization setting data unit 230. A CPU (Central Processing Unit) performs these controls based on a program (synchronization control program) installed in the multifunction peripheral 2.

With the above configuration of the functions, the network synchronizing system 1 of the first embodiment effectively performs network synchronization of setting data (in particular, setting data of users registered in the multifunction peripherals) of the multifunction peripheral among the plural multifunction peripherals 2. Further, when setting data of the identical user are independently managed by each multifunction peripheral, the data are associated (linked) prior to performing appropriate synchronization.

The setting data unit 210 and the synchronization common recording unit 220, or the setting data unit 210 may be formed of two HDD sections of exactly the same format, for recording the setting data. In this case, one of the sections is used as a recording part for recording setting data that are currently in operation while the other section is used as a recording part for recording setting data after the next network synchronization. With such a configuration, by switching the HDD section that is currently in operation after the network synchronization, a network synchronization result can be instantly reflected.

(Example of Setting Data as Object of Network Synchronization)

FIGS. 3 and 4A to 4D show examples of setting data as objects of the network synchronization. These data are recorded in the setting data unit 210, and further duplicated and recorded in the synchronization common recording unit 220. The setting data include personal setting data shown in FIG. 3, registered user data, deleted user data, identical user data, and authentication user data.

The personal setting data shown in FIG. 3 are setting data of each user, which exist for the number of (normally plural) users registered in the multifunction peripheral 2. The registered user data, deleted user data, identical user data, and authentication user data shown in FIG. 4 are catalogue data each showing a list of data of the plural users together.

The personal setting data shown in FIG. 3 are described. The personal setting data correspond to tables for managing the setting data of each registered user who can use the multifunction peripheral 2 (or another multifunction peripheral). Note that the personal setting data include the data of a user registered in another multifunction peripheral because that user is also registered in this multifunction peripheral by the network synchronization of the present invention. "User ID (unique)" indicates user specific data that specify a user in this multifunction peripheral. For example, the user ID is uniquely determined internally based on a combination of time data when the user is registered for the first time in this multifunction peripheral and apparatus unique data (network address (MAC address) and the like) of this multifunction peripheral, and the like.

"Pronunciation" indicates a user name (reading aid to indicate its pronunciation) of the user. "Organization" indicates the name of a group that the user belongs to. "Personal name (unique)" is a personal name unique to the user. These data are managed in, for example, the information processing server 3.

"User name (unique)" and "Password" indicate a user name (unique) and a password required for the user to log in to this multifunction peripheral. Note that the password, which is preferably updated regularly for security reasons, is not unique here.

"IC card number (unique)" indicates an IC card number (unique) as authentication reference data managed by the multifunction peripheral, which is used for the authentication by using the IC card when the user can log in to the multifunction peripheral by using the IC card.

"Windows (registered trademark) user name" and "Windows password" indicate authentication data required for the authentication with the information processing server 3, in the case where user authentication with the information processing server 3 (Windows server here), that is user authentication by an external server, is required when the user logs in to the multifunction peripheral.

Next, registered user data shown in FIG. 4A are described. The registered user data correspond to tables for managing data corresponding to preferences of users who are currently registered in the multifunction peripheral (or another multifunction peripheral). As described above, the registered user data are catalogue data showing a list of the plural users together.

"User ID" corresponds to the user ID shown in FIG. 3. "User name" corresponds to the user name (unique) in FIG. 3. "Personal name" corresponds to the personal name (unique) in FIG. 3. "Last login date and time (important)" are data related to a date and a time when the user last logged in to the multifunction peripheral. The last login date and time are automatically set inside the multifunction peripheral when the user last logged in to the multifunction peripheral. "Last update date and time (important)" are data related to a date and a time when personal setting data of the user are last updated in this multifunction peripheral. The last update date and time are automatically set inside the multifunction peripheral when the personal setting data of the user are last updated. "IC card number" corresponds to the IC card number in FIG. 3. "Personal setting file" is associated with the file of the personal setting data of the user in FIG. 3. "The personal setting file" is communicated between this multifunction peripheral and another multifunction peripheral. The file of the personal setting data in FIG. 3 may undergo data compression for the ease of this communication.

The data corresponding to the preferences of the users, which are managed in the registered user data shown in FIG. 4A, are not limited to those shown in FIG. 4A. For example, the data related to various contents such as a file of a cumulative document stored in this multifunction peripheral by the user, and a QR cover sheet having a QR code embedding the user ID of the user may be managed as well.

Further, such registered user data are appropriately updated by the network synchronization of this embodiment. It is preferable that plural (preferably three) sets of registered user data such as registered user data before a first update (and registered user data before a second update) be recorded, in addition to registered user data updated with the latest data, in the setting data unit 210. The plural data sets are recorded to be used for recovery from an unexpected error and the like.

Next, deleted user data in FIG. 4B are described. The deleted user data correspond to a table as a managing unit for managing deleted users. As described above, the deleted user data are catalogue data showing a list of plural users together. "User ID" corresponds to the user ID (unique) in FIG. 3. "Deleted date and time (important)" indicate data related to a date and a time when the users were deleted. These data are automatically set inside this multifunction peripheral when a user is deleted.

Next, identical user data in FIG. 4C are described. The identical user data correspond to a table as an associating unit for associating setting data of the identical users, which are independently managed in each multifunction peripheral.

"GUID" indicates identification data unique to this multifunction peripheral (and another multifunction peripheral). For example, these data are uniquely determined inside the multifunction peripheral, based on, for example, a combination of time data and apparatus unique data of this multifunction peripheral (network address (MAC address) and the like). These data are link data for associating user IDs provided independently in different multifunction peripherals. "User ID" corresponds to the user ID in FIG. 3.

For example, a user having a user name "TARO" is provided with a user ID of "01a" in one multifunction peripheral. In another multifunction peripheral, the user is provided with a user ID "01b". In this case, by issuing "A01", which is the identical GUID of these user IDs as shown in FIG. 4C, it can be determined that the user provided with the user ID "01b" and the user provided with the user ID "01a" are the identical user. In this manner, by providing the identical user data, the identical user, who is managed independently in the multifunction peripherals, can be associated as the identical user.

Subsequently, authentication user data shown in FIG. 4d are described. The authentication user data correspond to a table as a managing unit for further easily managing setting data of the identical user, who is associated as the identical user by the identical user data table in FIG. 4C. The authentication user data are formed based on the identical user list in FIG. 4C.

"User ID" corresponds to the user ID in FIG. 3 of this multifunction peripheral. "Remote user ID" corresponds to the user ID in FIG. 3 of another multifunction peripheral.

For example, when a user having a user ID "01b" logs in to this multifunction peripheral, the user cannot log in to the multifunction peripheral by using the user ID "01b". Therefore, by referring the identical user data table, it is found that GUID "A01" is allocated to the user id "01b" and further the user ID "01a" is allocated to GUID "A01". In this manner, the user having the user ID "01b" can log in to the multifunction peripheral as a user having the user ID "01a".

However, in this authentication user data table, user IDs registered in this multifunction peripheral, which are each shown as "user ID", and user IDs registered in another multifunction peripheral, which are "remote IDs", are associated on a one-on-one basis, so that it can be quickly known that the user IDs "01b" and "01a" are associated with each other without using GUID.

(Example of Synchronization Setting Data for Network Synchronization)

FIG. 5 is a diagram showing an example of synchronization setting data for the network synchronization. The synchronization setting data are recorded in the synchronization setting data unit 230. The synchronization setting data are system setting data related to the network synchronization of the present invention, which are unique to each multifunction peripheral. Based on such synchronization setting data, the synchronization control unit 240 performs various controls related to the network synchronization. Setting items shown in FIG. 5 are described below in association with a control operation of the synchronization control unit 240 shown in FIG. 2.

First, a last update date and time setting is described. The last update date and time setting is set inside the multifunction peripheral when the setting data that this multifunction peripheral holds are updated.

"Last update date and time" is a setting item related to a date and a time when the setting data that this multifunction peripheral holds are last updated by the network synchronization. This setting item is set inside the multifunction peripheral when this multifunction peripheral performs the network synchronization and the like. The synchronization control unit 240, in performing the network synchronization, compares the last update date and time of this multifunction peripheral and last update date and time of another multifunction peripheral, thereby updates the data by the setting data with newer (more recent) time and date. In this manner, synchronization is made between this multifunction peripheral and another multifunction peripheral. Accordingly, this multifunction peripheral can hold the latest setting data. For example, when there are three multifunction peripherals: A (last updated at 10), B (last updated at 11), and C (last updated at 12), which constitute the network synchronizing system 1, all the multifunction peripherals end in holding the setting data of the multifunction peripheral C (last updated at 12).

Next, a network synchronization setting is described. The network synchronization setting is a setting related to the network synchronization, as to whether this multifunction peripheral performs the network synchronization, and if it does, which synchronization interval is used, and the like.

"Network synchronization (YES or NO)" is a setting item for setting whether this multifunction peripheral performs the network synchronization. When "YES" is set, the synchronization control unit 240 can perform the network synchronization.

"Release synchronization common folder (the same as the synchronization common recording unit 220) (YES or NO)" is a setting item for setting whether the synchronization common folder of this multifunction peripheral is released to an external apparatus. When "YES" is set, a multifunction peripheral which is different from this multifunction peripheral can access the synchronization common folder of this multifunction peripheral. In other words, when "YES" is set in "release synchronization common folder" of another multifunction peripheral having the synchronization common recording unit 320, and the synchronization control unit 240 can access the synchronization common recording unit 320 of another multifunction peripheral. In this embodiment, "YES" may be set only in a predetermined multifunction peripheral of the multifunction peripherals 2 which constitute the network synchronizing system 1.

"Network path (1 to 1024 characters can be used, for example)" is a setting item related to a location of the synchronization common folder of another multifunction peripheral. By using the network path, the synchronization control unit 240 specifies a location of the synchronization common folder (for example, the synchronization common recording unit 320) of another multifunction peripheral, which is a destination of the connection. When "YES" is set in "release synchronization common folder" in this multifunction peripheral, the synchronization common folder of this multifunction peripheral is released to other multifunction peripherals. Therefore, since such a network path is not required to be set, this setting may be disabled. On the other hand, when "NO" is set, the setting of the network path may be enabled.

"Login user name (0 to 256 letters, numbers, or symbols in half size, for example)" and "login password (0 to 256 characters can be used, for example)" are setting items of a login user name and a login password used by a user to log in to the synchronization common folder of this multifunction peripheral, respectively. The synchronization control unit 240 can connect to a synchronization common folder (for example, the synchronization common recording unit 320) of another multifunction peripheral, by using a "login user name" and a "login password" of another multifunction peripheral.

"Automatic synchronization interval (for example, 10 to 9999 minutes)" is a setting item for setting a synchronization interval at which this multifunction peripheral performs the network synchronization with another multifunction peripheral. The synchronization control unit 240 performs network synchronization with another multifunction peripheral at the set automatic synchronization interval. This automatic synchronization interval can be set by a user. Alternatively, for sharing a network workload, the next time to perform the synchronization may be determined according to a synchronization interval probability X calculated using random numbers from an apparatus specific number and the current time.

The synchronization setting data shown in FIG. 5 have been described above. The synchronization setting data are setting data unique to each multifunction peripheral as described above. Based on such synchronization setting data, the synchronization control unit 240 performs various controls related to the network synchronization. The control operations are described below.

(Example of Network Synchronizing Operation)

Figure 6:
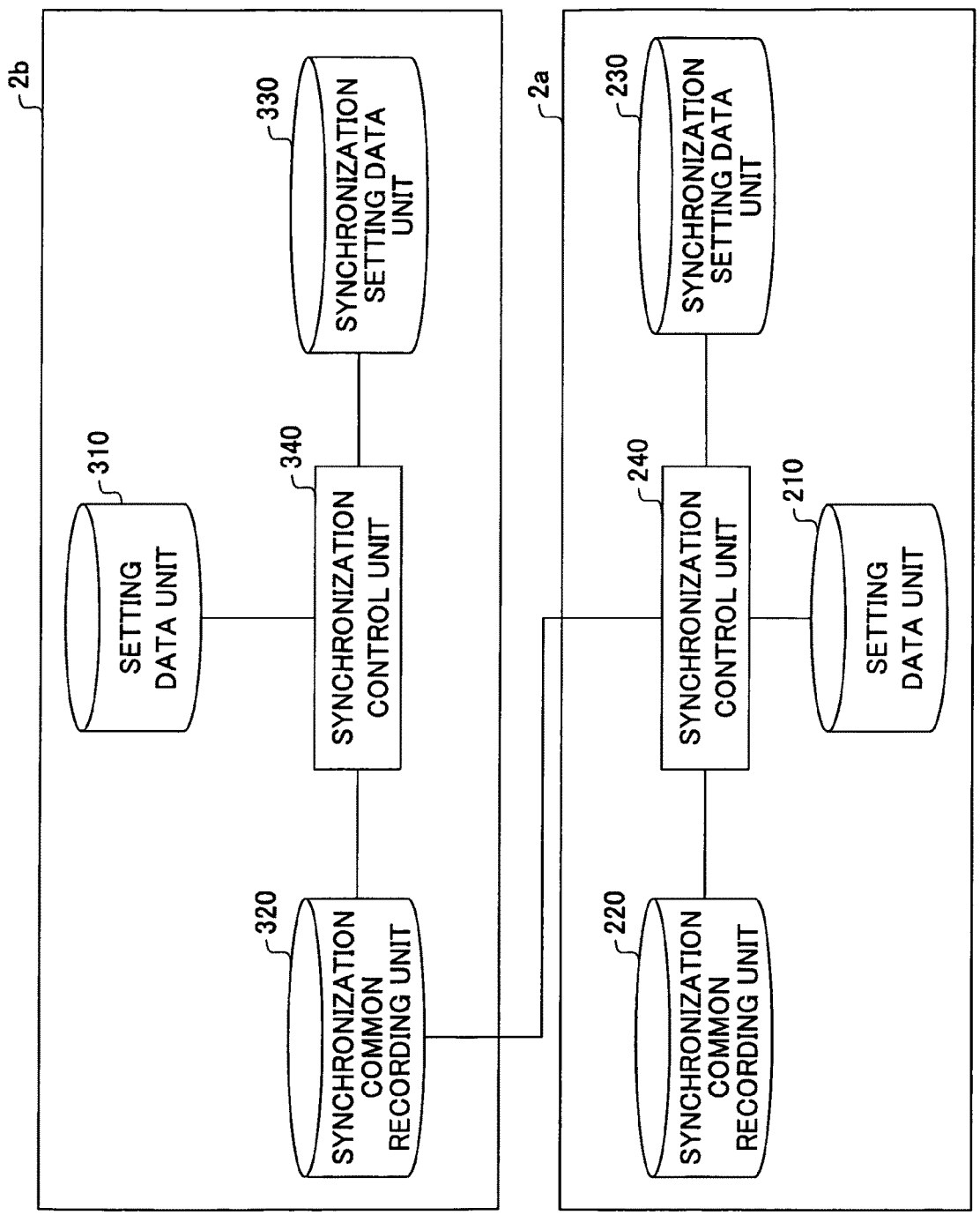
FIG. 6 is a diagram showing an example of a system configuration for describing a network synchronizing operation.

FIG. 6 is a diagram showing an example of a system configuration for describing the network synchronizing operation. Here, an example of an operation that a multifunction peripheral 2a (second apparatus) which has additionally entered the network synchronizing system 1 performs network synchronization of setting data with a multifunction peripheral 2b (first apparatus) which is different from the multifunction peripheral 2a. Setting data units 210 and 310 of the multifunction peripherals 2a and 2b record setting data (partly omitted) shown in FIG. 7 in advance, respectively. In FIG. 7, the identical user "TARO" is provided with different user IDs "01a" and "01b" in the multifunction peripherals 2a and 2b.

In this case, when the network synchronizing operation ends, the setting data shown in FIG. 7 become as shown in FIG. 8. When FIGS. 7 and 8 are compared, it can be seen that the user IDs "01a" and "01b" are associated with each other in the identical user data table of the multifunction peripheral 2b. Further, in the multifunction peripheral 2a a personal setting file of the user ID "01a" is updated from "File01a" to "File01b", and a user having a user ID "02b" is additionally registered. Furthermore, in an authentication user data table of the multifunction peripheral 2a the user IDs "01a" and "01b" are associated with each other.

In this embodiment, the network synchronizing operation is divided into an operation (first operation) for synchronizing setting data between the setting data unit 310 and the synchronization common recording unit 320 in the multifunction peripheral 2b and an operation (second operation) that the multifunction peripheral 2a which has additionally entered the network synchronizing system 1 performs synchronization with the multifunction peripheral 2b (synchronization common recording unit 320) and described sequentially. Note that "YES" is set in the setting item of "release synchronization common folder" in advance in the multifunction peripheral 2b. Accordingly, the multifunction peripheral 2a can access the synchronization common recording unit 320 of the multifunction peripheral 2b.

(Network Synchronizing Operation (First Operation))

Figure 9:
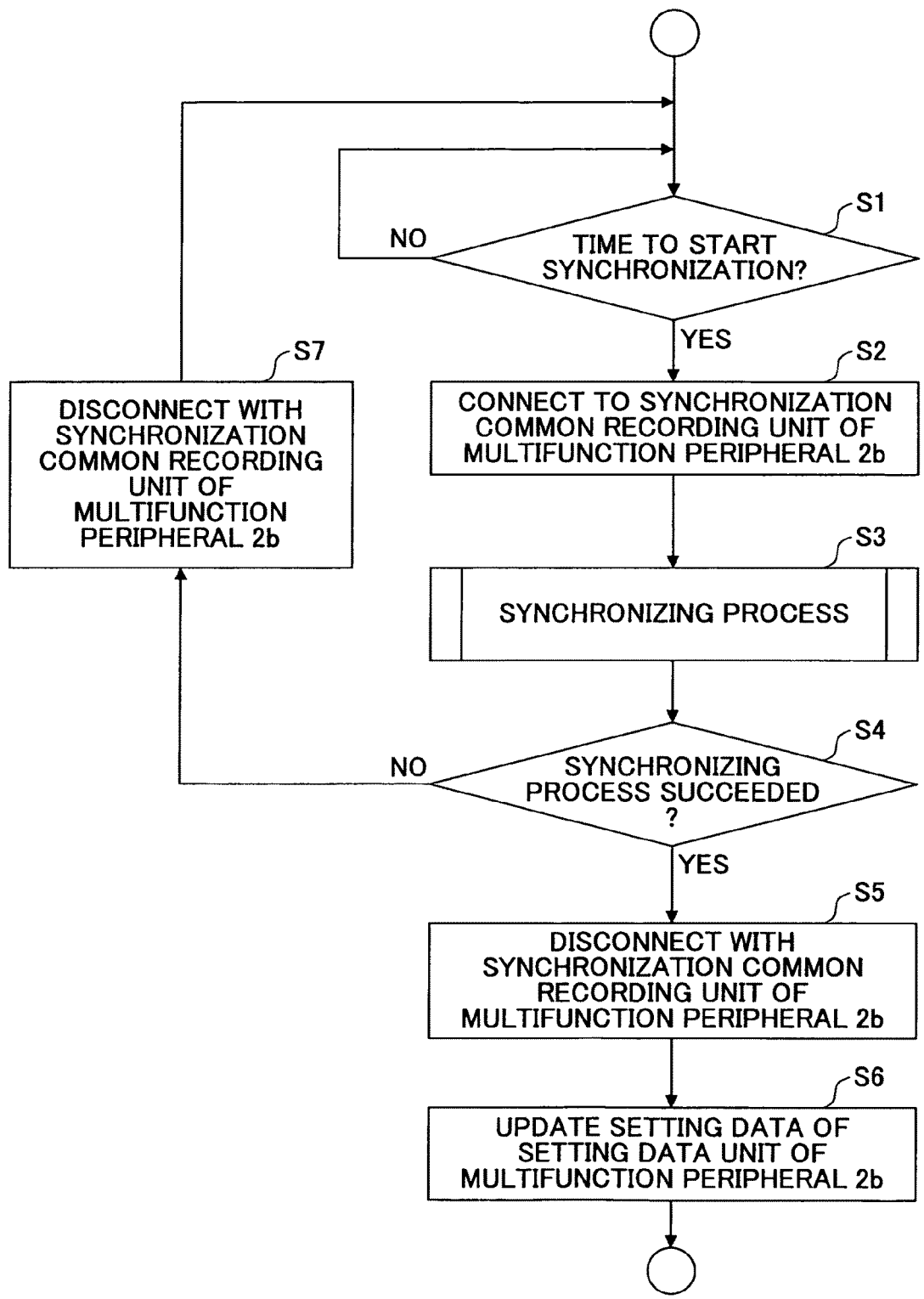
FIG. 9 is a flowchart showing an example of a first operation of a network synchronizing operation.
Figure 10:
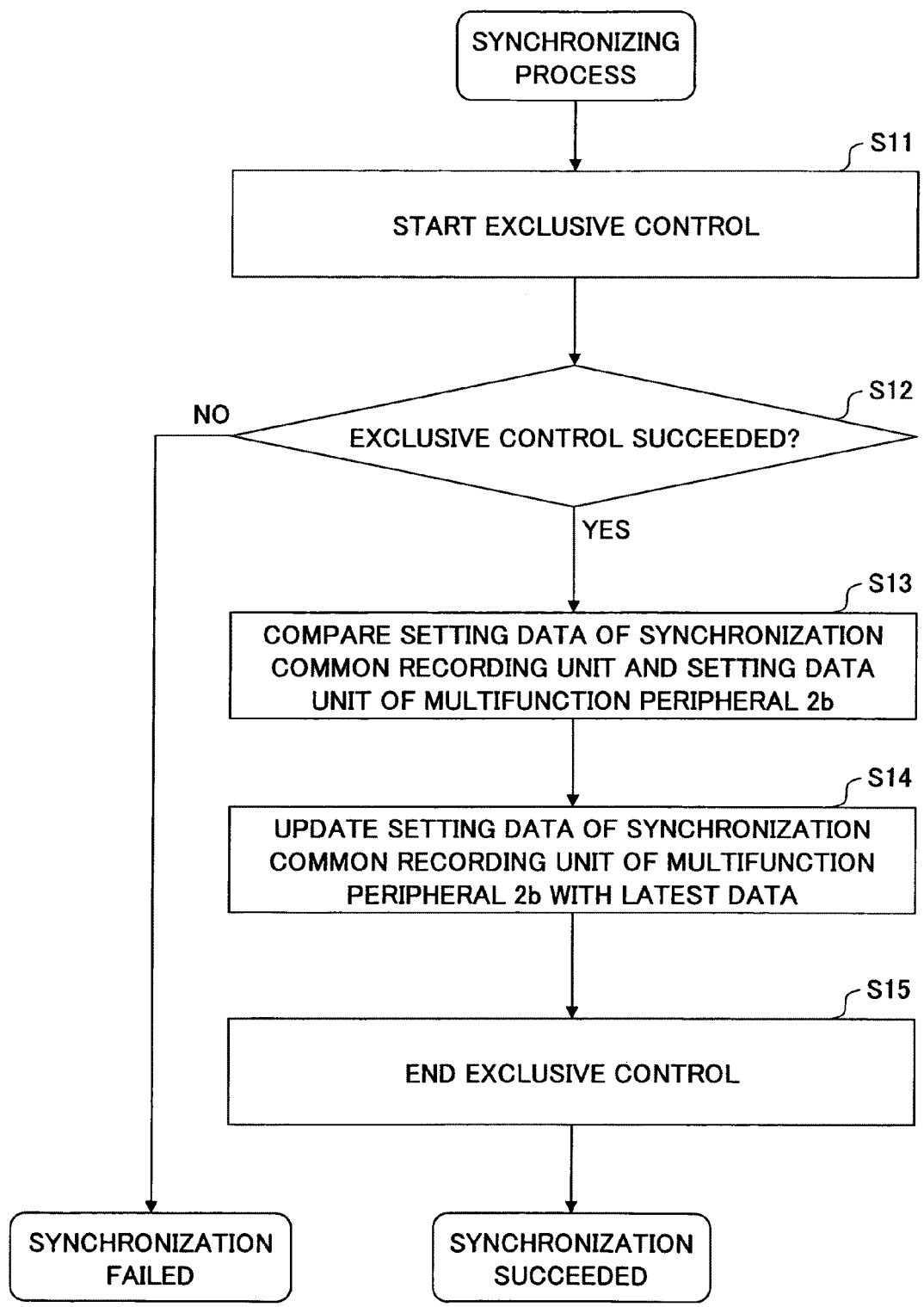
FIG. 10 is a flowchart showing a specific example of step S3 of FIG. 9.

First, the first operation is described. FIG. 9 is a flowchart of an example of the first operation of the network synchronizing operation. FIG. 10 is a flowchart of a specific example of step S3 in FIG. 9. Here, an example of the operation (first operation) for synchronizing the setting data between the setting data unit 310 and the synchronization common recording unit 320 in the multifunction peripheral 2b is described.

First, the multifunction peripheral 2b determines whether it is a time to start synchronization (S1). Here, the synchronization control unit 340 performs the determination based on the setting of "automatic synchronization interval" recorded in the synchronizing setting data unit 330. When it is the time to start the synchronization (S1, YES), the operation proceeds to step S2. When it is not the time to start the synchronization yet (S1, NO), the operation returns to step S1 and the process is repeated.

When the operation proceeds to step S2, the multifunction peripheral 2b connects to the synchronization common recording unit 320 of the multifunction peripheral 2b (S2). Here, the synchronization control unit 340 connects to the synchronization common recording unit 320.

When the operation proceeds to step S3, the multifunction peripheral 2b performs a synchronizing process with the synchronization common recording unit 320 of the multifunction peripheral 2b (S3). By the process related to step S3, the setting data recorded in the synchronization common recording unit 320 are updated by the setting data recorded in the setting data unit 310.

The process related to step S3 is described in detail with reference to FIG. 10 below.

First, the multifunction peripheral 2b starts an exclusive control (S11). Here, the synchronization control unit 340, for example, forms a directory, as the exclusive control. That is, before starting the synchronization, the multifunction peripheral 2b forms a directory in the synchronization common recording unit 320 of the multifunction peripheral 2b. Note that only an apparatus which has formed a directory successfully has a right to use the synchronization common recording unit 320 of the multifunction peripheral 2b.

The operation proceeds to step S12, in which the multifunction peripheral 2b determines whether the exclusive control is performed successfully (S12). When the exclusive control is performed successfully (S12, YES), the operation proceeds to step S13. When the exclusive control has failed (S12, NO), this process ends as a failure synchronization, since the synchronization has failed.

When the operation proceeds to step S13, the multifunction peripheral 2b compares setting data of the synchronization common recording unit 320 of the multifunction peripheral 2b with setting data of the setting data unit 310 of the multifunction peripheral 2b (S13). Here, since the setting data are not recorded in the synchronization common recording unit 320, the operation proceeds to step S14, in which the multifunction peripheral 2b updates the setting data of the synchronization common recording unit 320 of the multifunction peripheral 2b with the latest data (S14). Here, by duplicating the setting data recorded in the setting data unit 310 and recording the duplicated data into the synchronization common recording unit 320 of the multifunction peripheral 2b, the synchronization common recording unit 320 is updated and converted.

After step S14, the operation proceeds to step 15, in which the multifunction peripheral 2b ends the exclusive control which started in step S11 (S15). Here, the synchronization control unit 340 terminates the exclusive control by deleting the directory formed in step S11, and the like. Note that this process ends as successful synchronization, since the synchronization is performed successfully.

In FIG. 9, when the synchronizing process related to step S3 ends, the operation proceeds to step S4, in which the multifunction peripheral 2b determines whether the synchronizing process is performed successfully (S4). When the synchronizing process is performed successfully (S4, YES), the operation proceeds to step S5. When the synchronizing process has failed (S4, NO), the operation proceeds to step S7.

When the operation proceeds to step S5, the multifunction peripheral 2b disconnects the connection with the synchronization common recording unit 320 of the multifunction peripheral 2b (S5), which started in step S2. Here, the synchronization control unit 340 disconnects the connection with the synchronization common recording unit 320.

Subsequently, the operation proceeds to step S6, in which the multifunction peripheral 2b updates the setting data of the setting data unit 310 of the multifunction peripheral 2b (S6). Here, the synchronization control unit 340 updates the setting data of the setting data unit 310 by the setting data of the synchronization common recording unit 320, which have been updated with the latest data. In this operation example, the synchronization common recording unit 320 records no data initially, therefore, the setting data unit 310 and the synchronization common recording unit 320 have the same setting data. As a result, the process related to step S6 can be omitted.

When the setting data unit 310 is formed of a HDD section having the same format and recording setting data in step S6, the HDD section currently in operation is switched, so that the synchronization result can be instantly reflected. Note that this switching is preferably performed after all users who use the multifunction peripheral 2b have logged out. Further, after step S6, the operation proceeds to step S1 again.

When the operation proceeds to step S7, the multifunction peripheral 2b disconnects the connection with the synchronization common recording unit 320 of the multifunction peripheral 2b (S7), which has started in step S2, and the operation proceeds to step S1 again.

By the above-described processes, the operation (first operation) to synchronize the setting data between the setting data unit 310 and the synchronization common recording unit 320 in the multifunction peripheral 2b is performed. Accordingly, the setting data shown in an upper part of FIG. 7 are recorded in the synchronization common recording unit 320.

(Network Synchronizing Operation (Second Operation))

Figure 11:
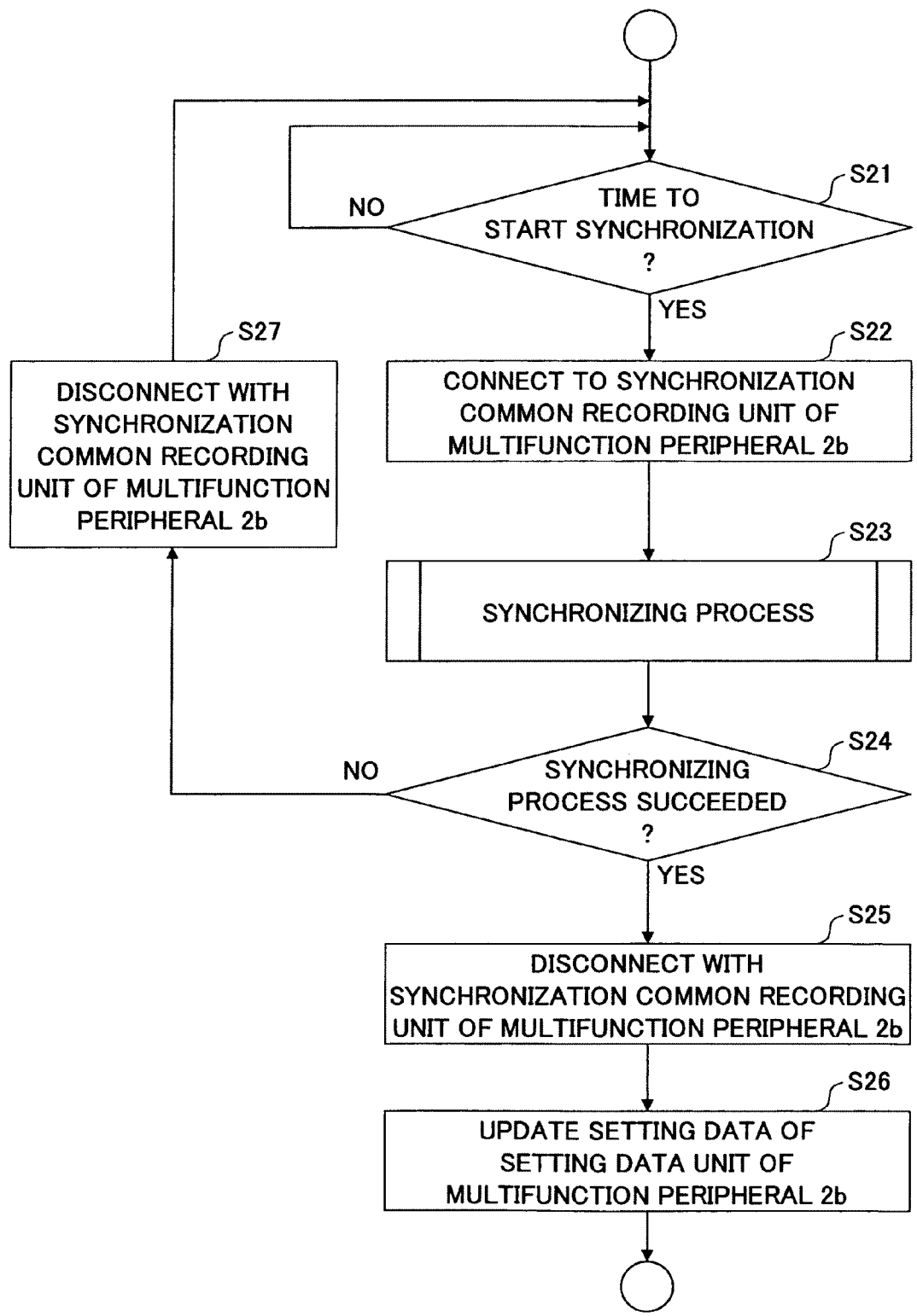
FIG. 11 is a flowchart showing an example of a second operation of a network synchronizing operation.
Figure 12:
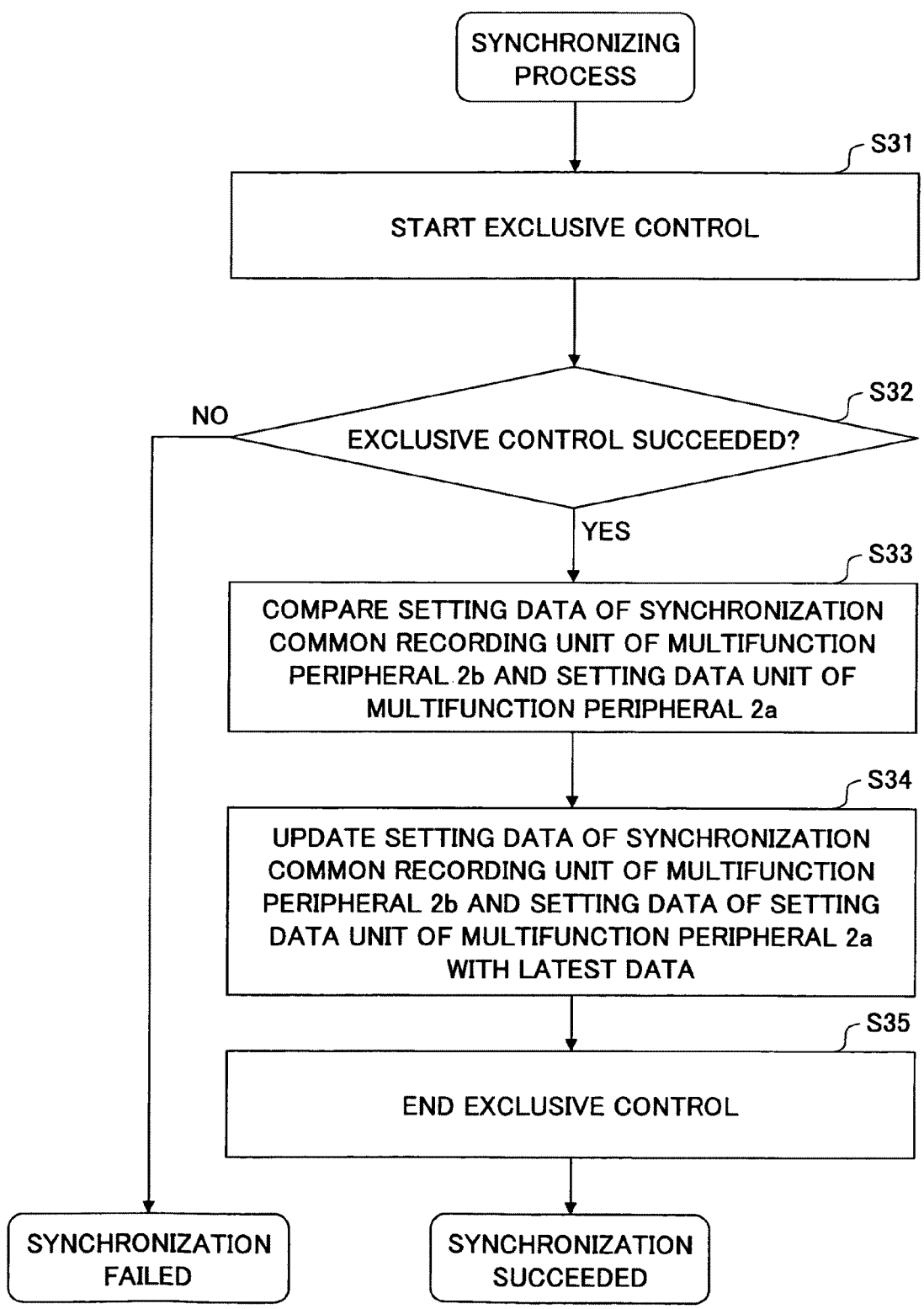
FIG. 12 is a flowchart showing a specific example of step S23 of FIG. 11.

Next, an example of the second operation is described. Note that the setting data shown in the upper part of FIG. 7 are recorded by the first operation in the synchronization common recording unit 320. FIG. 11 is a flowchart showing an example of the second operation of the network synchronizing operation. FIG. 12 is a flowchart showing a specific example of step S23 of FIG. 11.

First, the multifunction peripheral 2a determines whether it is a time to start synchronization (S21). Here, the synchronization control unit 240 performs this determination based on the setting of "automatic synchronization interval" recorded in the synchronization setting data unit 230. When it is the time to start the synchronization (S21, YES), the operation proceeds to S22. When it is not the time to start the synchronization yet (S21, NO), the operation returns to step S21 and the process is repeated.

When the operation proceeds to S22, the multifunction peripheral 2a connects to the synchronization common recording unit 320 of the multifunction peripheral 2b (S22), which is a destination of the synchronization. Here, the synchronization control unit 240 connects to the synchronization common recording unit 320 of the multifunction peripheral 2b.

When the operation proceeds to step S23, the multifunction peripheral 2a performs a synchronizing process with the multifunction peripheral 2b as the destination of the synchronization (S23). By the processes related to step S23, the setting data recorded in the synchronization common recording unit 320 of the multifunction peripheral 2b are updated. The processes related to step S23 are described in detail with reference to FIG. 12.

First, the multifunction peripheral 2a starts an exclusive control (S31). Here, the synchronization control unit 240, for example, forms a directory in the synchronization common recording unit 320 as the exclusive control. That is, before starting the synchronization, the synchronization control unit 240 forms a directory in the synchronization common recording unit 320 in the multifunction peripheral 2b as the destination of the synchronization. Note that only an apparatus which has formed a directory successfully has a right to use the synchronization common recording unit 320 of the multifunction peripheral 2b.

The operation proceeds to step S32, in which the multifunction peripheral 2a determines whether the exclusive control is performed successfully (S32). When the exclusive control is performed successfully (S32, YES), the operation proceeds to step S33. When the exclusive control has failed (S32, NO), this process ends as failure synchronization, since the synchronization has failed.

When the operation proceeds to step S33, the multifunction peripheral 2a compares the setting data (see the upper part of FIG. 7) in the synchronization common recording unit 320 of the multifunction peripheral 2b as the destination of the synchronization and the setting data (see a lower part of FIG. 7) in the setting data unit 210 of the multifunction peripheral 2a (S33).

In step S33, first, the synchronization control unit 240 associates identical users between users of the registered user data in the setting data unit 210 and users in the registered user data in the synchronization common recording unit 320. For example, a user name of the user ID "01a" in the lower part of FIG. 7 and a user name of the user ID "01b" in the upper part of FIG. 7 are the same, which is "TARO". In this manner, by determining that users having the same user names between the different multifunction peripherals are the identical user, the users are associated with each other. The setting data of the user who is determined as the identical user are associated in the identical user data table.

The operation proceeds to step S34, in which the multifunction peripheral 2a updates the setting data in the synchronization common recording unit 320 of the multifunction peripheral 2b as the destination of the synchronization and the setting data in the setting data unit 210 of the multifunction peripheral 2a with the latest data (S34). Here, after the comparison in step S33, the synchronization control unit 240 updates and converts the setting data recorded in the synchronization common recording unit 320 of the multifunction peripheral 2b and the setting data recorded in the setting data unit 210 in the multifunction peripheral 2a with the latest data.

In step S34, since the multifunction peripheral 2a is an apparatus which has additionally entered the network synchronizing system 1, the setting data held therein are all treated as old data. Therefore, the multifunction peripheral 2a updates the personal setting files of the users based on the setting data recorded in the synchronization common recording unit 320 of the multifunction peripheral 2b.

As a result, the setting data in the lower part of FIG. 7 are changed into setting data shown in a lower part of FIG. 8. It is seen that all the personal setting files are updated in a registered user data table shown in the lower part of FIG. 8. Further, the setting data in the upper part of FIG. 7 are updated by the setting data shown in an upper part of FIG. 8. As shown in an identical user data table shown in the upper part of FIG. 8, the setting data managed in respective multifunction peripherals are associated (linked) with each other.

After the process related to step S34, the operation proceeds to step S35, in which the multifunction peripheral 2a ends the exclusive control (S35), which has started in step S31. Here, the synchronization control unit 240 ends the exclusive control by deleting the directory formed in step S31, and the like. This process ends as a successful synchronization, since the synchronization is performed successfully.

In FIG. 11, when the synchronizing process related to step S23 ends, the operation proceeds to step S24, in which the multifunction peripheral 2a determines whether the synchronizing process has succeeded (S24). When the synchronizing process has succeeded (S24, YES), the operation proceeds to step S25. When the synchronizing process has failed (S24, NO), the operation proceeds to step S27.

When the operation proceeds to step S25, the multifunction peripheral 2a disconnects the connection with the synchronization common recording unit 320 (S25), which has started in step S22. Here, the synchronization control unit 240 disconnects the connection with the synchronization common recording unit 320.

Next, the operation proceeds to step S26, in which the multifunction peripheral 2b updates the setting data in the setting data unit 210 thereof (S26). When the setting data unit 210 is a HDD section having the same format and recording setting data, the HDD section currently in operation is switched, so that the synchronization result can be instantly reflected. Note that this switching is preferably performed after all users using the multifunction peripheral 2b have logged out from the multifunction peripheral 2b. Further, after the process related to step S26, the operation proceeds to step S21 again.

When the operation proceeds to step S27, the multifunction peripheral 2b disconnects the connection with the synchronization common recording unit 320 (S27), which has started in step S22. Then, the operation proceeds to step S21 again.

By the aforementioned processes, the operation (second operation) is performed, in which the multifunction peripheral 2a which has additionally entered the network synchronizing system 1 performs synchronization with the multifunction peripheral 2b (synchronization common recording unit 320). Accordingly, the setting data as shown in the lower part of FIG. 8 are recorded in the setting data unit 210.

According to the network synchronizing system 1 and the multifunction peripheral 2 of the first embodiment, which are described above, synchronization can be performed between the multifunction peripheral 2 and another multifunction peripheral connected through a network, without using an apparatus such as a server apparatus. This synchronization is realized since the multifunction peripherals 2 always leave the latest setting data in the synchronization common folder, which is released in the network. Further, according to the first embodiment, synchronization can be appropriately realized after the setting data of the identical users, who are independently managed in the different multifunction peripherals 2, are associated (linked) with each other.

In the process related to step S33, the users are determined as the identical user when they have the same user names, however, this determination is not limited to be made by the user name. As long as data uniquely provided for the users are used, it is more preferable to perform the determination by using IC card numbers, or biometric data when biometric data of users associated to the users are managed. Further, in addition to the user name, the determination may also be performed by using the "Windows user name" and the "Windows password" in the personal setting data (see FIG. 3) of the user. In this case, authentication with the information processing server 3 (that is, authentication by an external server) is performed and the user name is automatically changed to a user name of the user which is managed on the information processing server 3, and the like, so that the users can be associated between the multifunction peripheral 2 and the information processing server 3.

(First Deformation Example of Network Synchronizing Operation)

Next, as a first deformation example of the network synchronizing operation, an example of an operation to perform network synchronization of the setting data among multifunction peripherals when new identical users are registered in the multifunction peripherals 2a and 2b after the above-described network synchronizing operation. Note that in the setting data units 210 and 310 of the multifunction peripherals 2a and 2b, respectively, setting data shown in FIG. 13 (identical users having user names of "SABURO" and "SHIRO", partly omitted) are recorded in advance.

The operation in this case also includes the first operation shown in FIGS. 9 and 10 and the second operation shown in FIGS. 11 and 12 performed in this order. Steps S33 and S34 in FIG. 12 are further described.

When the operation proceeds to step S33, the multifunction peripheral 2a compares the setting data (see an upper part of FIG. 13) in the synchronization common recording unit 320 of the multifunction peripheral 2b as a destination of the synchronization and the setting data (see a lower part of FIG. 13) of the multifunction peripheral 2a (S33).

In step S33, first, the synchronization control unit 240 associates identical users between users in the registered user data in the setting data unit 210 and users in the registered user data in the synchronization common recording unit 320. Here, a user ID "03a" in the lower part of FIG. 13 and a user ID "03b" of the upper part of FIG. 13 have the same user name, "SABURO". Moreover, a user ID "04a" and a user ID "04b" have the same user name, "SHIRO". When the user names are identical between the different multifunction peripherals in this manner, the users are determined as the identical user to be associated with each other. Note that setting data of the user determined to be the identical user are associated in the identical user data table.

The operation proceeds to step S34, in which the multifunction peripheral 2a updates the setting data in the synchronization common recording unit 320 of the multifunction peripheral 2b and the setting data in the setting data unit 210 in the multifunction peripheral 2a with the latest data (S34). Here, the synchronization control unit 240 updates the personal setting files of the users based on the setting data in the synchronization common recording unit 320 of the multifunction peripheral 2b and the setting data unit 210 of the multifunction peripheral 2a. Here, the last update dates and times of the users are compared, so as to retain the personal setting file with the newer (more recent) last update date and time. For example, the user having the user name "SABURO" has the newer (more recent) last update date and time in the upper part of FIG. 13, therefore, the personal setting file "File03b" is determined to be retained. On the other hand, the user having the user name "SHIRO" has the newer last update date and time in the lower part of FIG. 13, therefore, the personal setting file "File04a" is determined to be retained. Then, the setting data in the lower part of FIG. 13 are updated to setting data shown in a lower part of FIG. 14. Moreover, the setting data on the upper part of FIG. 13 are updated to setting data shown in an upper part of FIG. 14. Accordingly, the setting data of the users can be synchronized between the multifunction peripherals.

As described above, according to the first deformation example, when the identical new user is registered in the multifunction peripherals 2a and 2b, network synchronization of the setting data between the multifunction peripherals can be effectively performed by using the identical user data table.

(Second Deformation Example of Network Synchronizing Operation)

Next, as a second deformation example of the network synchronizing operation, an example of an operation to perform network synchronization of setting data between multifunction peripherals, when the identical user registered in the multifunction peripherals 2a and 2b is deleted in one of the multifunction peripherals after the network synchronizing operation. In the setting data units 210 and 310 of the multifunction peripherals 2a and 2b, setting data (users "SABURO" and "SHIRO" are deleted in the multifunction peripheral 2b) shown in FIG. 15 are recorded in advance.

The operation in this case also includes the first operation shown in FIGS. 9 and 10 and the second operation shown in FIGS. 11 and 12 performed in this order. Steps S33 and S34 in FIG. 12 are further described.

When the operation proceeds to step S33, the multifunction peripheral 2a compares the setting data (see an upper part of FIG. 15) in the synchronization common recording unit 320 of the multifunction peripheral 2b and the setting data (see a lower part of FIG. 15) in the setting data unit 210 of the multifunction peripheral 2a (S33).

In step S33, first, the synchronization control unit 240 associates identical users between users in the registered user data in the setting data unit 210 and users in the registered user data in the synchronization common recording unit 320. Here, setting data of the user determined to be the identical user are already associated in the identical user data table of the upper part of FIG. 15, therefore, association of the setting data of the users is not performed here.

The operation proceeds to step S34, in which the multifunction peripheral 2a updates the setting data in the synchronization common recording unit 320 of the multifunction peripheral 2b and the setting data in the setting data unit 210 of the multifunction peripheral 2a with the latest data (S34). Here, the synchronization control unit 240 updates the personal setting file of the user, based on the setting data in the synchronization common recording unit 320 of the multifunction peripheral 2b, and the setting data in the setting data unit 210 of the multifunction peripheral 2a. The problem here is a user who is deleted in one of the multifunction peripherals (here, the multifunction peripheral 2b) and logs in to the other multifunction peripheral (here, the multifunction peripheral 2a) after the deletion, such as a user having a user name "SABURO". Such a user, who is considered as using the network synchronizing system 1, is retained. That is, by comparing the last login date and time of the user and deleted date and time of the user on the deleted user data table, when the last login date and time is newer than the deleted date and time, the setting data are updated so as to retain the user. When the last login date and time is older than the deleted date and time, on the other hand, the user is considered not using the network synchronizing system 1 any more and deleted. Then, the setting data in the lower part of FIG. 15 are updated to setting data shown in a lower part of FIG. 16. Further, the setting data in the upper part of FIG. 15 are updated to setting data shown in an upper part of FIG. 16. As shown in the registered user data table in the upper part of FIG. 16, the user who logged in to the multifunction peripheral 2a after the deletion in the multifunction peripheral 2b is registered again in the multifunction peripheral 2b. The data of this user are deleted from the deleted user data table in the upper part of FIG. 16.

As described above, according to the second deformation example, when the identical user registered in the multifunction peripherals 2a and 2b is deleted in one of the multifunction peripherals 2a and 2b, the network synchronization of the setting data can be effectively performed between the multifunction peripherals 2a and 2b by using the identical user data table and the deleted user data table.

(Third Deformation Example of Network Synchronizing Operation)

In the above embodiment, the synchronization common recording unit 320 which is released in the network is provided inside the multifunction peripheral 2b, and the multifunction peripheral 2b performs synchronization between the setting data unit 310 and the synchronization common recording unit 320 in the multifunction peripheral 2b (first operation). In this deformation example, the released synchronization common recording unit 320 is provided outside the multifunction peripheral 2b. In this case, the synchronization common recording unit is provided in the network system including the multifunction peripherals 2a and 2b. The multifunction peripherals 2a and 2b each performs synchronization between its setting data unit and the synchronization common recording unit released in the network. In the above embodiment, the multifunction peripheral 2b requires no network path for indicating a location of the synchronization common recording unit in another multifunction peripheral in the first embodiment. However, the multifunction peripheral 2b requires a network path to indicate the location of the synchronization common recording unit similarly to the multifunction peripheral 2a in this deformation example, since the multifunction peripheral 2b references the synchronization common recording unit provided outside the multifunction peripheral as well as similarly to the multifunction peripheral 2a. Therefore, in this deformation example, all multifunction peripherals in the synchronizing system are connected, according to network paths, to the synchronization common recording unit provided outside the multifunction peripheral to perform synchronization with the synchronization common recording unit. All the multifunction peripherals perform the second operation, while the first operation is not performed. In this deformation example, the synchronization common recording unit may be any recording unit capable of recording data which can be accessed by another multifunction peripheral, such as a file server and NAS (Network Attached Storage). In this manner, when the synchronization common recording unit is provided outside the multifunction peripherals, there are advantages in that it becomes easier to replace the synchronization common recording unit (for example, when a new product with superior capacity or access speed is manufactured), the recording unit in the multifunction peripheral is not loaded, and the like.

The first, second, and third deformation examples of the network synchronizing operation of the first embodiment have been described. In addition, the deformation examples can be variously changed by using the registered user data table, the deleted user data table, and the identical user data table, in the following manners: when the network synchronization is performed between two multifunction peripherals, the same user name as a user in the registered user data tables of the both multifunction peripherals may be renamed by attaching "_N"; the same user name as a user in the registered user data table of one of the multifunction peripherals may be registered in the identical user data table to leave the user with a newer last update date and time; when there are users having the same personal names in the registered user data tables of the both multifunction peripherals, a user with an older last update date and time may be renamed by attaching "_N"; and when there are identical IC card numbers, the IC card number of a user with an older last update date and time may be deleted and that user may be notified of the deletion when the user logs in to the multifunction peripheral next time.

For example, the following case is considered: when a predetermined user prints out, by using a multifunction peripheral, a QR cover sheet having a QR code embedding the user's user ID that is managed in the multifunction peripheral, the user can log in to the multifunction peripheral by using the QR cover sheet. In such a case, it is assumed that setting data of the user, which are independently managed between different multifunction peripherals (the multifunction peripheral and another multifunction peripheral), are associated with each other in the identical user data (or authentication user data) in FIG. 4, which are recorded in the multifunction peripheral.

In this case, when the user prints out, by this another multifunction peripheral, a QR cover sheet having a QR code embedding the user's user ID managed in another multifunction peripheral, the user can log in to the multifunction peripheral by using the QR cover sheet.

That is, when the multifunction peripheral receives a request to log in by a user registered in a different multifunction peripheral, the multifunction peripheral permits the user to log in to the multifunction peripheral, based on personal setting data of a user of the multifunction peripheral, who is associated with the user registered in the different multifunction peripheral. As a reference example, this operation is described in a third embodiment below.

[Second Embodiment]

A second embodiment of the present invention is described with reference to FIGS. 17 to 20. Here, by using the system of the network synchronization described in the first embodiment, update data that are common among multifunction peripherals (referred to simply as "common update data" hereinafter), such as update data of functions of the multifunction peripheral or antivirus definition data are effectively applied to each multifunction peripheral.

Common update data obtained by a multifunction peripheral, which constitutes the network synchronizing system 1, can be applied to other multifunction peripherals by, for example, transferring common update data obtained by the multifunction peripheral which constitutes the network synchronizing system 1 via a download server such as the Internet to other multifunction peripherals by the network synchronization; or after the common update data are applied in the multifunction peripheral, reflecting a setting other multifunction peripherals to apply the setting by the network synchronization. In this manner, the common update data can be applied to the other multifunction peripherals.

(System Configuration Example)

A configuration of a network synchronizing system of the second embodiment is a similar to the network synchronizing system 1 (see FIG. 1) in the first embodiment, therefore, its description is omitted here.

(Configuration Example of Functions Related to Application of Update Data)

Figure 17:
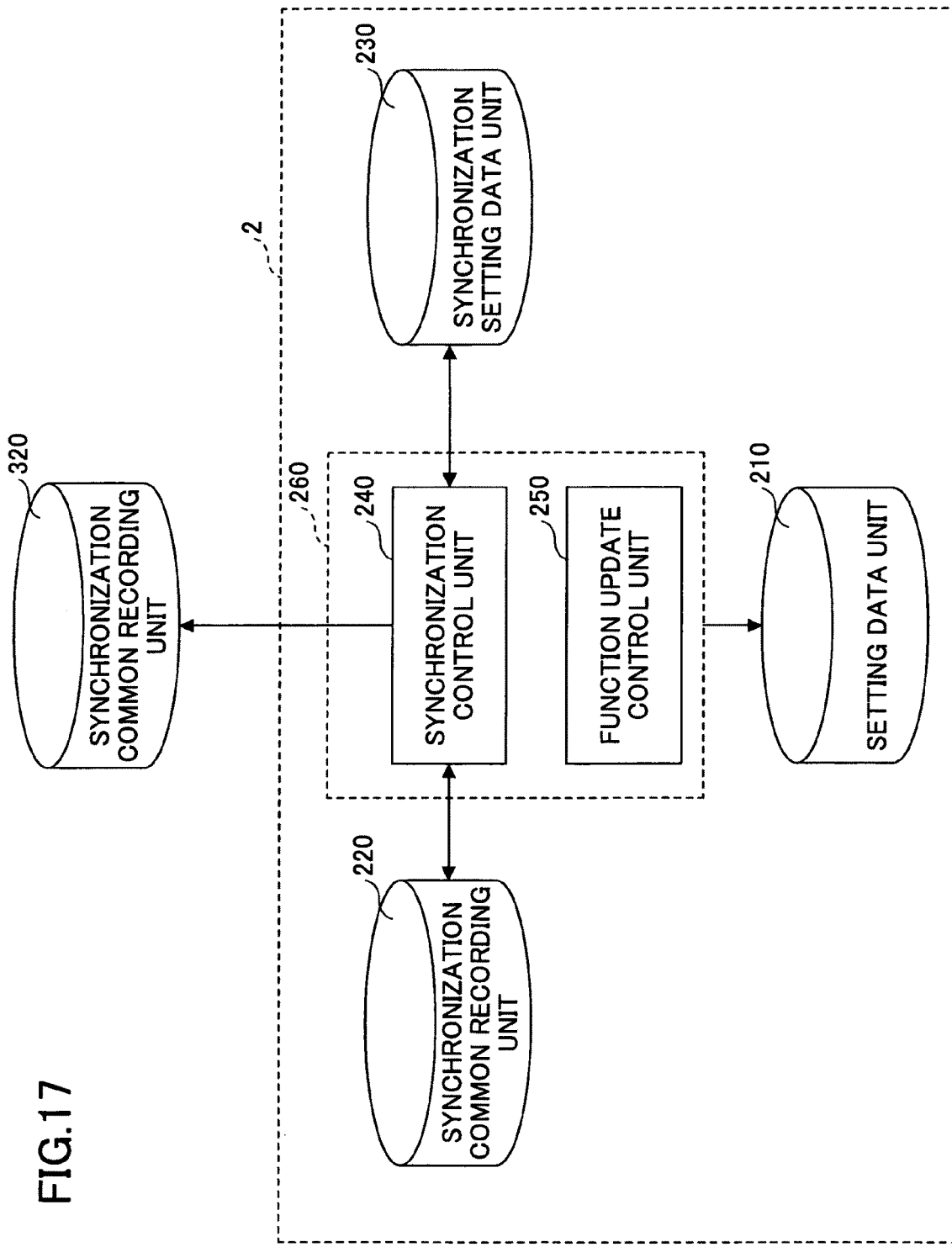
FIG. 17 is a block diagram showing a configuration example of functions of a multifunction peripheral of a second embodiment.

FIG. 17 is a block diagram showing a configuration example of functions of a multifunction peripheral of the second embodiment. In FIG. 17, the multifunction peripheral 2 includes the setting data unit 210, the synchronization common recording unit 220, the synchronization setting data unit 230, the synchronization control unit 240, a function update control unit 250, and the like. Here, a difference in the configuration of the functions of the multifunction peripheral between the first embodiment (see FIG. 2) and this embodiment is described.

The setting data unit 210 records setting data of the multifunction peripheral 2. The setting data here include the common update data in addition to setting data of the users (personal setting data), which are described in the first embodiment.

The synchronization common recording unit 220 records setting data as an object of the network synchronization in the network synchronizing system 1. The setting data as the object of the network synchronization are the common update data recorded in the setting data unit 210 and the like, which are duplicated and recorded in the synchronization common recording unit 220.

The synchronization setting data unit 230 records synchronization setting data which correspond to setting data related to an operation of the network synchronization and the like. An example of the synchronization setting data related to the second embodiment is described below with reference to FIG. 18.

The synchronization control unit 240 performs various controls related to the network synchronization, based on the synchronization setting data recorded in the synchronization setting data unit 230.

The function update control unit 250 performs a control related to updating of a function, based on the synchronization setting data recorded in the synchronization setting data unit 230. For example, the function update control unit 250 performs updating data based on the common update data recorded in the setting data unit 210 and the synchronization common recording unit 220.

By the above configuration of the functions, update data that are common among multifunction peripherals, such as update data of functions of the multifunction peripheral and antivirus definition data, are effectively applied to the multifunction peripherals by using the system of the network synchronization in the network synchronizing system 1 of the second embodiment.

Note that the synchronization control unit 240 and the function update control unit 250 are not clearly distinguished from each other, and can be collectively called a control unit 260 since both units are function units for controlling operations related to the network synchronization. Here, the synchronization control unit 240 and the function update control unit 250 are distinguished when described, however, they can be designed differently as required, in accordance with an embodiment of the present invention.

(Example of Synchronization Setting Data for Network Synchronization)

FIG. 18 is a diagram showing an example of synchronization setting data for network synchronization. These synchronization setting data are recorded in the synchronization setting data unit 230. Based on such synchronization setting data, the synchronization control unit 240 and the function update control unit 250 perform various controls related to the network synchronization and updating of the functions. Below, setting items are described in association with the control operations of the synchronization control unit 240 and the function update control unit 250.

Since the last update date and time setting and the network synchronization setting are similar to those described in the first embodiment (see FIG. 5), descriptions thereof are omitted here.

Next, settings related to update data are described. The settings related to update data include whether the common update data are automatically downloaded (transferred) and the like in the multifunction peripheral 2, and whether updating based on the common update data is automatically performed (application of the common update data).

"Automatic download (YES or NO)" is a setting item for setting whether the multifunction peripheral 2 automatically downloads the common update data. Based on this setting item, the synchronization control unit 240 automatically downloads the common update data recorded in a synchronization common folder (for example, the synchronization common recording unit 320) of another multifunction peripheral and the like, or prevents downloading of the common update data itself.

"Downloading method (via download server, via network synchronization)" is a setting item for setting whether the multifunction peripheral 2 performs downloading of the common update data via a download server or via network synchronization. In the case of downloading the common update data via the network synchronization, the synchronization control unit 240 downloads common update data recorded in a synchronization common folder (for example, the synchronization common recording unit 320) of another multifunction peripheral based on this setting item. In the case of downloading the common update data via the download server, the common update data are downloaded via the Internet, or via the information processing server 3 when the download server is the information processing server 3. In this manner, "downloading method (via download server or via network synchronization)" allows selection of downloading the common update data via the network synchronization or via the download server.

Note that a multifunction peripheral, in which "download via server" is set in this setting item, can be configured so that "YES" is necessarily set in the setting item of "release synchronization common folder". In this case, "via network synchronization" is set in other multifunction peripherals (setting of "via download server" is prevented). Then, all the other multifunction peripherals can obtain the common update data from the synchronization common folder, which the multifunction peripheral with the setting of "via download server" releases. That is, the common update data that the multifunction peripheral constituting the network synchronizing system 1 obtains via the download server such as the Internet can be transferred to other multifunction peripherals by the network synchronization. Accordingly, reduction of network workload between the network synchronizing system 1 and an external apparatus such as the download server, and the like can be realized.

"Automatic execution interval (for example, 24 to 999 hours)" is a setting item for setting an execution interval at which the multifunction peripheral 2 automatically downloads the common update data. The synchronization control unit 240 automatically downloads the common update data at the set automatic execution interval. The automatic execution interval can be set by a user. Alternatively, for sharing a network load, a next time to perform the automatic download may be determined according to an execution interval probability X calculated with random numbers from an apparatus specific number and the current time.

"Automatic update (YES or NO)" is a setting item for setting whether the multifunction peripheral 2 automatically performs updating based on the common update data recorded in the multifunction peripheral 2. When "YES" is set in "automatic download" and "automatic update", the function update control unit 250 automatically performs updating based on the common update data, which are automatically downloaded by the synchronization control unit 240.

"Manual update (YES or NO)" is a setting item for setting whether updating based on the common update data recorded in the multifunction peripheral 2 is performed manually. When "YES" is set in "automatic download" and "manual update", the synchronization control unit 240 automatically downloads the common update data and records them in the setting data unit 210 of the multifunction peripheral 2. However, since the updating based on the common update data is performed manually, a user of the multifunction peripheral can instruct the function update control unit 250 whether to update the common update data depending on the downloaded common update data, after checking the common update data.

"Version selection (select from downloaded versions)" is a setting item for selecting a version of the common update data to be used for updating. That is, a version of the common update data to be used for updating by the multifunction peripheral 2 is selected among the common update data (there are plural versions of common update data recorded) stored in the multifunction peripheral 2. That is, a version used for updating is selected. Versions of the common update data are created one after another by a publisher, in general. In such a condition, it is not always appropriate to perform updating based on the latest common update data. It is preferable to check the safety of operations of each version of common update data, prior to applying the common update data to the multifunction peripheral 2. Therefore, when "YES" is set in "manual update", the user can select a version of the common update data to be applied to the multifunction peripheral 2 when performing the manual update, by setting a version in the "version selection".

"Reflect version selection to network synchronization (YES or NO)" is a setting item for setting whether the setting of "version selection (select from downloaded versions)" is reflected (replicated) to other multifunction peripherals. For example, when "YES" is set in "manual update" and "NO" is set in "reflect version selection to network synchronization", and the setting item "reflect version selection to network synchronization" is changed to "YES" after the manual update is performed, the synchronization control unit 240 reflects the "version selection" of the multifunction peripheral 2 to other multifunction peripherals by using the system of the network synchronization. Accordingly, other multifunction peripherals can be updated with the update data of the same version as that of the multifunction peripheral 2, by the network synchronization with the multifunction peripheral 2. "Notify download/update (YES or NO)" is a setting item for setting whether to notify a user of the downloading of the common update data and/or the updating based on the common update data in the multifunction peripheral 2. When "YES" is set, the user is notified of the downloading and/or updating by an email formed based on a title and text set in "title (displayable character, for example 01 to 256 characters)" and "text (displayable characters, for example 01 to 2048 characters)", and the like. For example, the title such as "downloading completed at 12 on May 6th" and the text such as "Downloading is completed at 12 on May 6th. Following data are downloaded." are prepared in advance. The function update control unit 250 notifies the user by using these title and text. When "YES" is set in "automatic download" and "manual update", a user, who received the notification by an email and the like after the common update data are downloaded, can manually perform updating based on the downloaded update data.

Next, a setting related to automatic reboot is described, which is a setting related to automatic reboot, as to whether the multifunction peripheral 2 is automatically rebooted.

"Automatic reboot (YES or NO)" is a setting item for setting whether the multifunction peripheral 2 is automatically rebooted. For example, in the case where the updating based on the common update data is performed when the multifunction peripheral is rebooted, this setting item is set as "YES".

"Automatic reboot time (for example, 00:00 to 23:59)" is a setting item for setting an execution time at which the multifunction peripheral is automatically rebooted. When "YES" is set in "automatic reboot", the function update control unit 250 automatically reboots the multifunction peripheral 2 at the set execution time. Further, when updating based on the common update data is performed in rebooting the multifunction peripheral 2, the updating based on the common update data is also performed at this time. This execution time can be set by a user, to be a time (for example, 04:00) at which the multifunction peripheral 2 is unlikely to be used.

The synchronization setting data have been described with reference to FIG. 18 so far. The synchronization control unit 240 performs various controls related to the network synchronization based on these synchronization setting data. Moreover, the function update control unit 250 performs a control related to updating of functions, based on the setting related to, in particular, update data in the synchronization setting data.

Therefore, there is an advantage in that common update data obtained by a multifunction peripheral, which constitutes the network synchronizing system 1, can be applied to other multifunction peripherals by, for example, transferring common update data obtained by the multifunction peripheral which constitutes the network synchronizing system 1 via a download server such as the Internet to other multifunction peripherals by the network synchronization; or after the common update data are applied in the multifunction peripheral, reflecting a setting to allow application and a setting of version data to be applied to other multifunction peripherals by the network synchronization.

An operation related to downloading (obtaining and transfer) of the common update data and an operation related to updating based on the common update data are separately described. Note that these operations are described with reference to a system configuration shown in FIG. 6.

(Network Synchronizing Operation (Downloading))

First, as an operation related to downloading of the common update data, an operation is described where the multifunction peripheral 2b, in which "via download server" is set in the setting of "download method" shown in FIG. 18, downloads the common update data via a download server and then uploads the common update data into the synchronization common recording unit 320 of the multifunction peripheral 2b.

Figure 19:
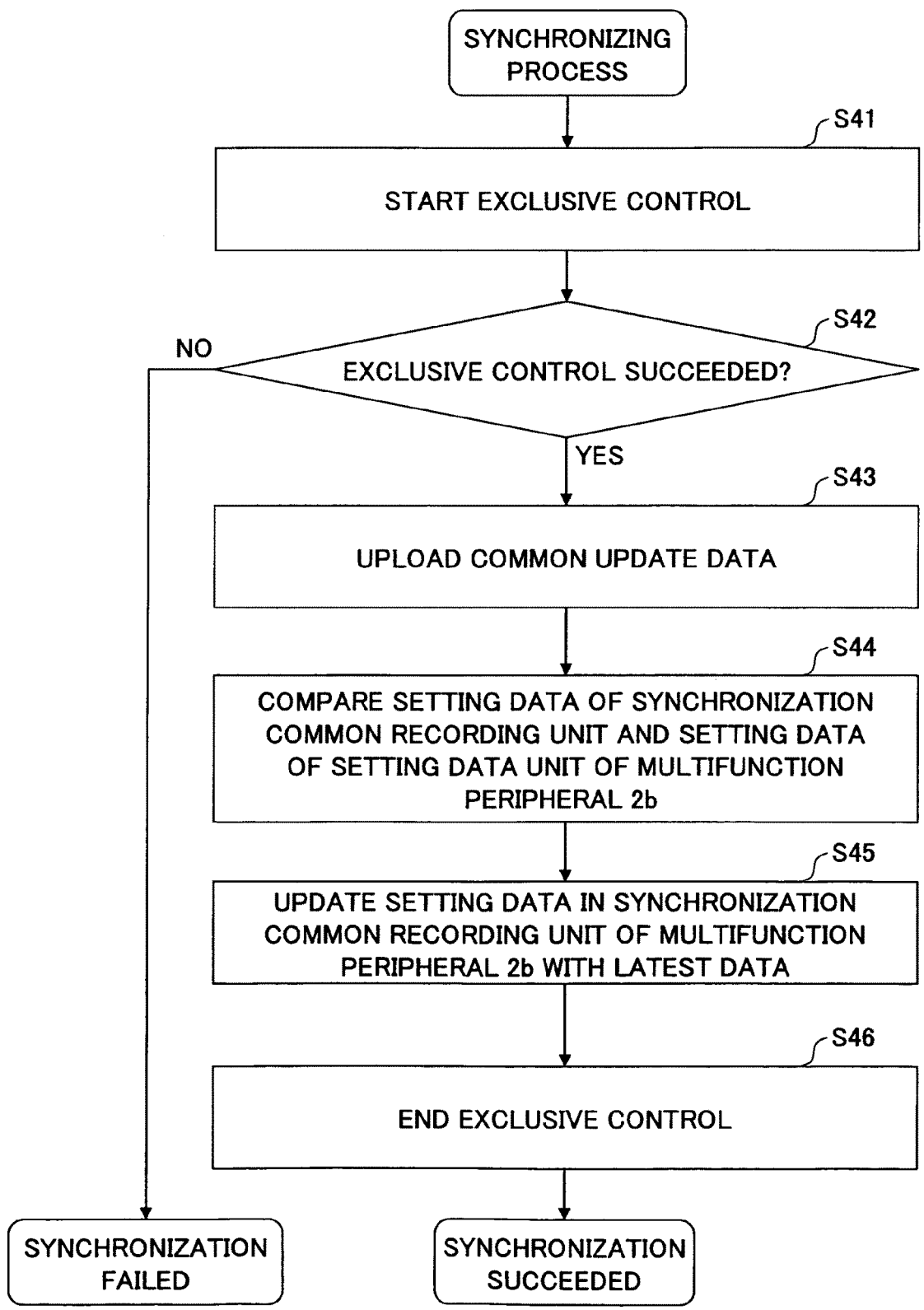
FIG. 19 is a flowchart showing an example of an operation related to a synchronizing process (download via a download server) of the second embodiment.

An operation related to the network synchronization of the multifunction peripheral of the second embodiment (downloading via the download server) is similar to that described in the first embodiment (see FIG. 9), however, a synchronizing process, which is different from the synchronizing process of step S3 in FIG. 9, is described here. FIG. 19 is a flowchart showing an example of an operation related to the synchronizing process (downloading via the download server) of the second embodiment.

Processes related to steps S41 through S46 of FIG. 19 are similar to those of S11 through S15 in FIG. 10 except that step S43 is additionally provided. Therefore, step S43 is described here.

When the operation proceeds to step S43, the multifunction peripheral 2b uploads the common update data (S43). Here, the synchronization control unit 340 of the multifunction peripheral 2b uploads the common update data that the multifunction peripheral 2b has downloaded, to the synchronization common recording unit 320. By this process, another multifunction peripheral (for example, the multifunction peripheral 2a) can obtain the common update data from the synchronization common recording unit 320 by the network synchronization.

Next, an operation is described where the multifunction peripheral 2a, in which "via network synchronization" is set in the setting of "download method" in FIG. 18, downloads the common update data from the multifunction peripheral 2b via the network synchronization.

Figure 20:
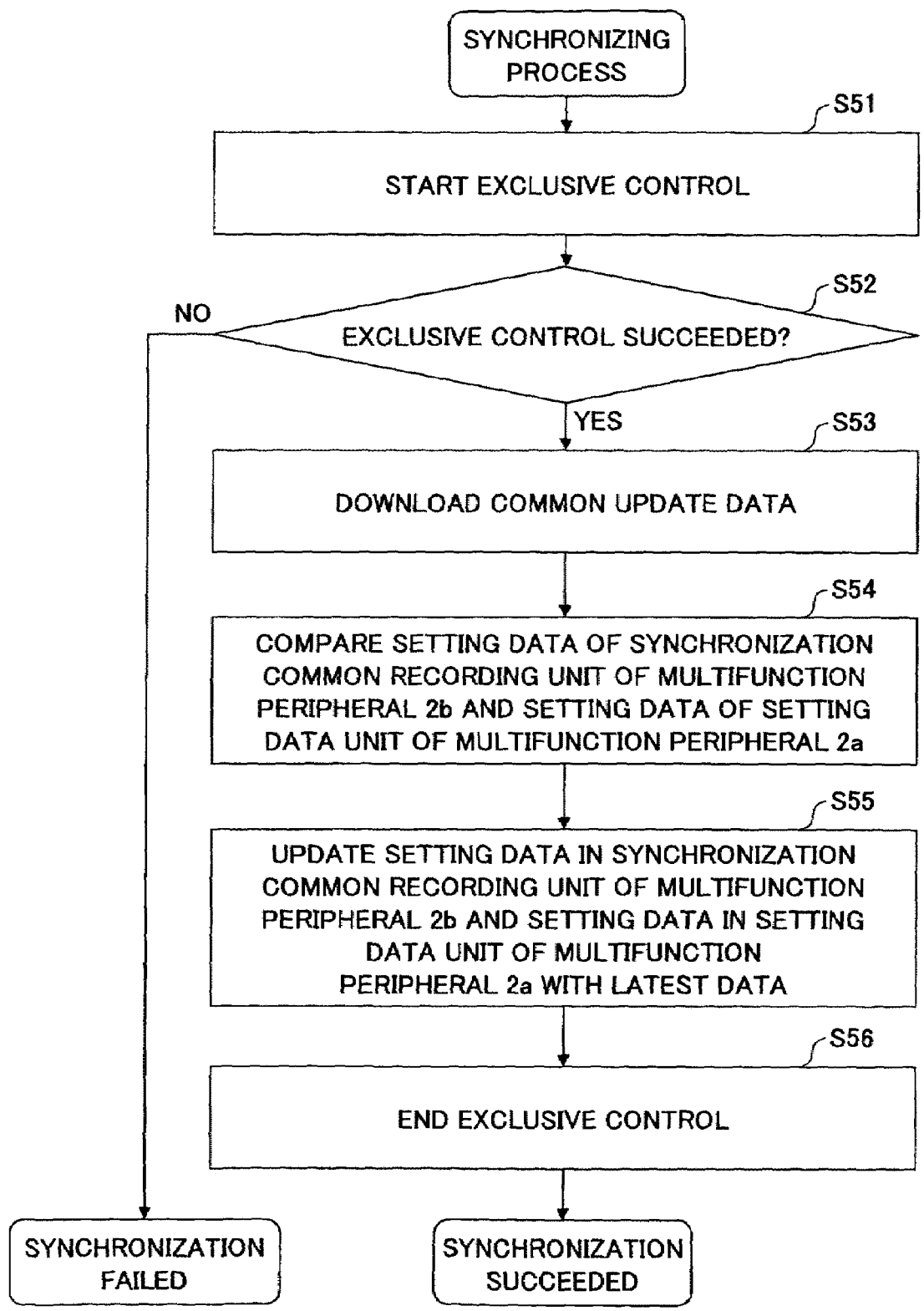
FIG. 20 is a flowchart showing an example of an operation related to a synchronizing process (download via network synchronization) of the second embodiment.

Note that an operation related to the network synchronization of the multifunction peripheral of the second embodiment (downloading via the download server) is similar to that described in the first embodiment (see FIG. 11), however, a synchronizing process which is different from the synchronizing process of step S3 in FIG. 11 is described here. FIG. 20 is a flowchart showing an example of the operation related to the synchronizing process (downloading via the download server) of the second embodiment.

Processes related to steps S51 through S56 of FIG. 20 are similar to those related to steps S31 through S35 of FIG. 12, except that step S53 is additionally provided. Therefore, step S53 is described here.

When the operation proceeds to step S53, the multifunction peripheral 2a downloads the common update data (S53). Here, the synchronization control unit 240 downloads the common update data from the synchronization common recording unit 320. By this process, common update data obtained by a multifunction peripheral constituting the network synchronizing system 1 via a download server such as the Internet can be transferred to other multifunction peripherals by the network synchronization.

(Example of Network Synchronizing Operation (Manual Update))

Subsequently, an operation related to updating based on the common update data is described. When "YES" is set in the setting of "automatic update" shown in FIG. 18, a multifunction peripheral automatically updates the common update data, for example, when the multifunction peripheral is rebooted, therefore, a description thereof is omitted here.

For example, in the case where "YES" is set in the setting of "manual update" and "NO" is set in the setting of "reflect version selection to network synchronization" in the multifunction peripheral 2b as shown in FIG. 18, and the setting of "reflect version selection to network synchronization" is changed to "YES" after the multifunction peripheral 2b is updated manually, the synchronization control unit 340 of the multifunction peripheral 2b updates the synchronization common recording unit 320 with the data related to "version selection" of the multifunction peripheral 2b.

Then, another multifunction peripheral (for example, the multifunction peripheral 2a) obtains the data related to "version selection" from the synchronization common recording unit 320 by the network synchronization with the multifunction peripheral 2b. As a result, an operation to perform updating based on the common update data of a version indicated by "version selection" can be performed when, for example, the multifunction peripheral 2a is rebooted.

That is, by the above-described processes, the common update data can be applied to other multifunction peripherals, and the like, by such processes as applying the common update data in a multifunction peripheral that constitutes the network synchronizing system 1 and then reflecting the setting to be applied and a setting of version data to be applied to other multifunction peripherals by the network synchronization.

[Third Embodiment]

A third embodiment of the present invention is described with reference to FIGS. 21 through 25. By using the system of network synchronization, which is described in the first embodiment, the same setting data managed independently by the different multifunction peripherals 2 can be associated with each other. Therefore, for example, when a predetermined user, by using a multifunction peripheral, prints out a sheet (QR cover sheet) having a QR code recording the user's user ID managed in the multifunction peripheral, which is used for logging in to the multifunction peripheral, the user can log in not only to this multifunction peripheral but to another multifunction peripheral as well by using this sheet. That is, when a user of another multifunction peripheral requests to log in to the multifunction peripheral, this user can log in to the multifunction peripheral based on user data of the multifunction peripheral, which are associated with the user of that another multifunction peripheral in the authentication user data shown in FIG. 4.

Figure 24:
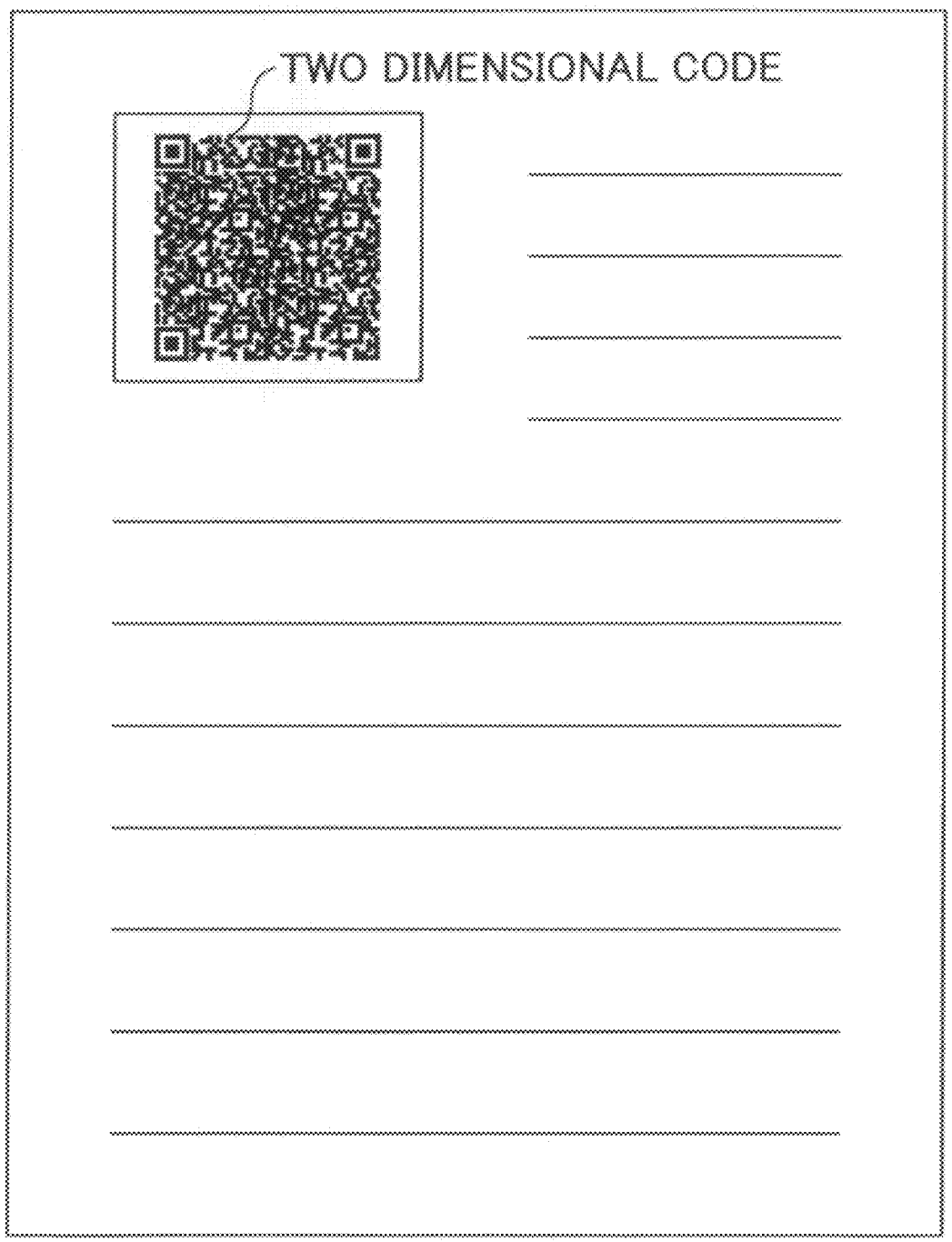
FIG. 24 is a diagram showing an example of image data to be obtained.

In the following description, a user ID can be used as one of identification data items recorded in a QR code shown in FIG. 24, which is described below.

(Configuration of Multifunction Peripheral)

Figure 21:
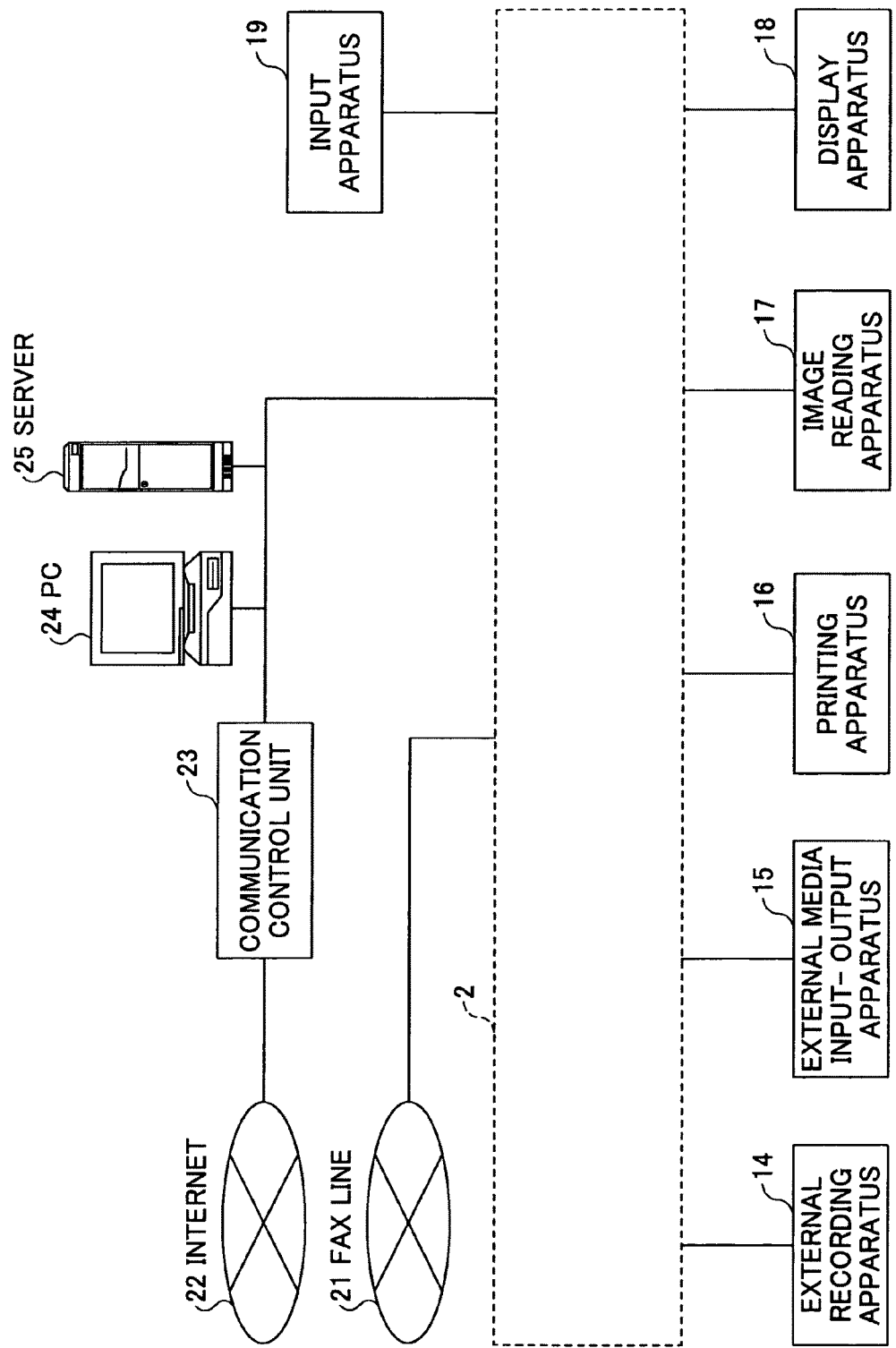
FIG. 21 is a block diagram showing a schematic configuration of a multifunction peripheral of a third embodiment.

FIG. 21 is a block diagram showing a schematic configuration of a multifunction peripheral of the third embodiment. In FIG. 21, the multifunction peripheral 2 is connected through a bus and the like to an external recording apparatus 14, an external media input-output apparatus 15, a printing apparatus 16, an image reading apparatus 17, a display apparatus 18, an input apparatus 19, and the like.

Moreover, the multifunction peripheral 2 sends and receives facsimile data with another facsimile apparatus through a FAX line 21, is connected to an external apparatus through a communication control unit 23 such as the Internet 22, a modem, and a router, and is connected to a personal computer (referred to as a PC, hereinafter) 24 and a server computer (referred to as a server hereinafter) 25 in a wired or wireless manner, so as to send and receive data.

The multifunction peripheral 2 includes a CPU (Central Processing Unit) which is not shown, for controlling the above-described various apparatuses connected to the multifunction peripheral 2 and the like, a memory unit formed of a ROM (Read Only Memory), a RAM (Random Access Memory) and the like, a FAX control unit, a LAN control unit, an input-output apparatus control unit, a recording apparatus control unit, an image processing control unit, and an input control unit. Further, the multifunction peripheral 2 includes a recording apparatus formed of an incorporated hard disk drive (referred to as HDD, hereinafter) connected to the recording device control unit and the like, a printing control unit connected to the image processing control unit, an image reading control unit, a display control unit, and the like.

The external recording apparatus 14 is a recording apparatus such as an external HDD (Hard Disk Drive). The external media input-output apparatus 15 is an input-output apparatus used for inputting and outputting data from/to media such as a multimedia card (registered trademark), a smart media card (registered trademark), a memory stick (registered trademark), an SD memory card (registered trademark), a CD-ROM, a floppy (registered trademark) disk, and a USB memory (registered trademark).

The printing apparatus 16 is an output apparatus formed of a laser printer, an inkjet printer, and the like which are capable of monochrome, color, and double-sided printing. The image reading apparatus 17 is an apparatus that reads a document image as electronic data by an optical process and the like. The display apparatus 18 is an output apparatus formed of a touch panel, a CRT, liquid crystals, and the like.

The input apparatus 19 is an apparatus for inputting data, which is formed of a touch panel, key buttons, or the like. The input apparatus 19 may be an apparatus formed of a microphone for inputting audio data.

As described above, the multifunction peripheral 2 of the third embodiment controls the various apparatuses connected to (or included in) the multifunction peripheral 2.

Further, the multifunction peripheral 2 controls image data obtained by the image reading apparatus 17 and the like by identifying and outputting (or recording) the image data according to the identification data included in the image data. The identification data are data used for identification in a computer, such as an output file name (or a stored file name). The multifunction peripheral 2 performs a process to additionally provide the identification data included in the image data, which are obtained by the image reading apparatus 17 and the like, in an output file name to output the image data, and the like.

As a result, the identification data (for example, header data) of the image data can be effectively set when outputting the image data. A specific configuration and the like of this operation are described with reference to FIG. 22 below.

(Configuration of Functions)

Figure 22:
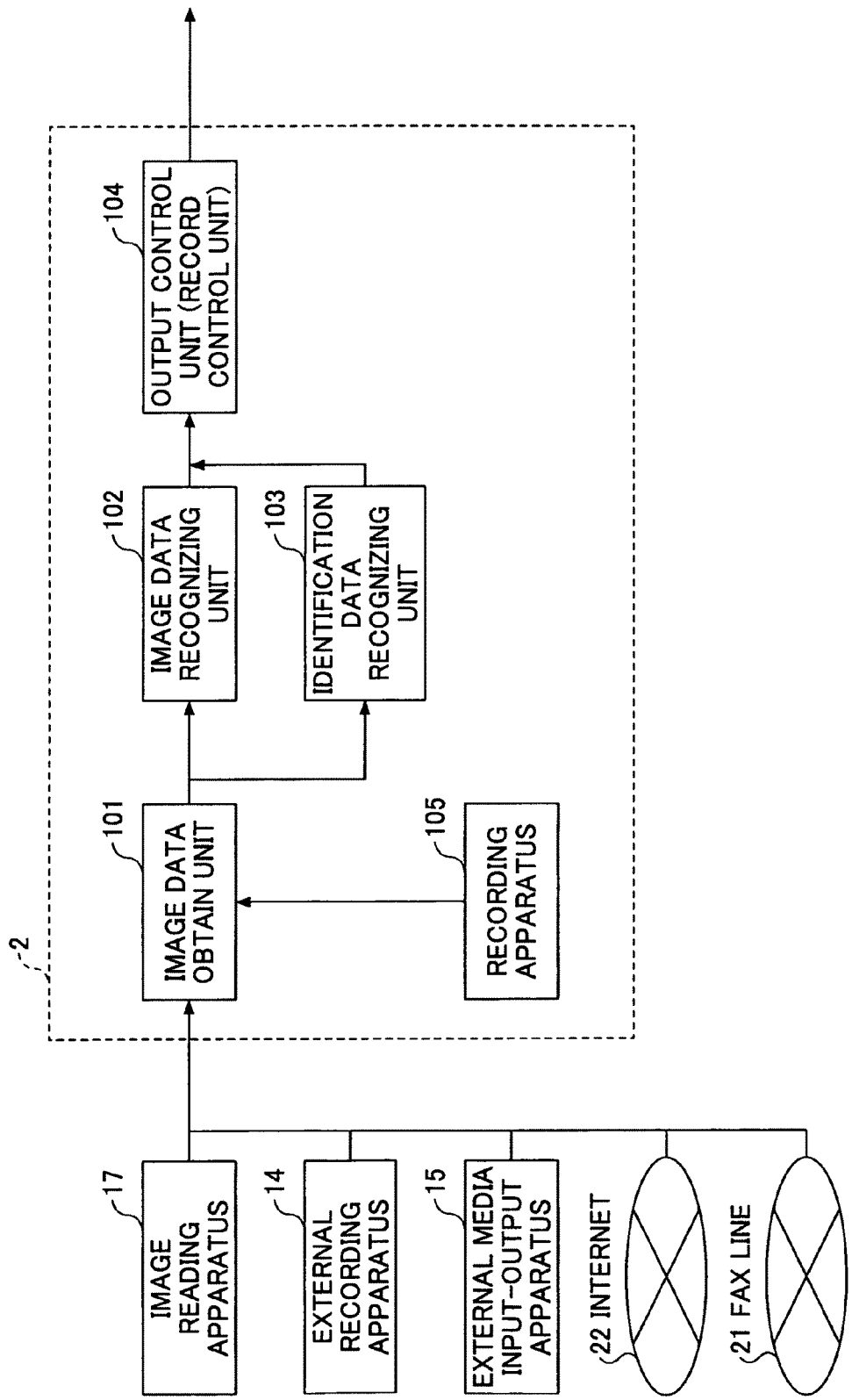
FIG. 22 is a block diagram showing an example of a configuration of functions of a multifunction peripheral of the third embodiment.

FIG. 22 is a block diagram showing an example of a configuration of functions of a multifunction peripheral of the third embodiment. Note that arrows connecting blocks in FIG. 22 indicate major flows of signals, and do not limit the functions of the blocks.

In FIG. 22, the multifunction peripheral 2 includes an image data obtaining unit 101, an image data recognizing unit 102, an identification data recognizing unit 103, an output control unit (record control unit) 104, a recording apparatus 105, and the like.

The image data obtaining unit 101 obtains image data, such as image data read by the image reading apparatus 17, image data recorded in the external recording apparatus 14, the external media input-output apparatus 15, or the recording apparatus 105, image data received from an external apparatus through the Internet 22, image data based on facsimile data received from another facsimile apparatus through the FAX line 21, and the like.

The image data recognizing unit 102 recognizes the image data obtained by the image data obtaining unit 101. The identification data recognizing unit 103 recognizes identification data included in the image data obtained by the image data obtaining unit 101. For example, the image data recognizing unit 103 recognizes the identification data based on an optical reading code such as a QR code (registered trademark) included in the image data. The identification data are data used for identification in a computer, such as an output file name (or a recorded file name) related to an output (or recording) operation by the output control unit (record control unit) 104, which is described below.

The output control unit (record control unit) 104 identifies and outputs (or records) the image data recognized by the image data recognizing unit 102 according to the identification data recognized by the identification data recognizing unit 103. For example, header data are additionally provided as identification data for the image data, thereby an image is formed on a recording medium by the printing apparatus 16. Alternatively, for example, identification data are additionally provided in a file name or a title of an electronic file generated based on the image data and sent as a facsimile through the FAX line 21 to another facsimile apparatus or sent to an external apparatus connected through the Internet 22. Furthermore, identification data are additionally provided in a file name (including a document name, a category name, and the like) of an electronic file generated based on the image data and thus the electronic file is recorded in the recording apparatus 105 and the like.

By the above-described configuration, in the multifunction peripheral 2, the image data obtained by the image reading apparatus 17 and the like are identified and outputted (or recorded) according to the identification data included in the image data.

(Operation Example)

Figure 23:
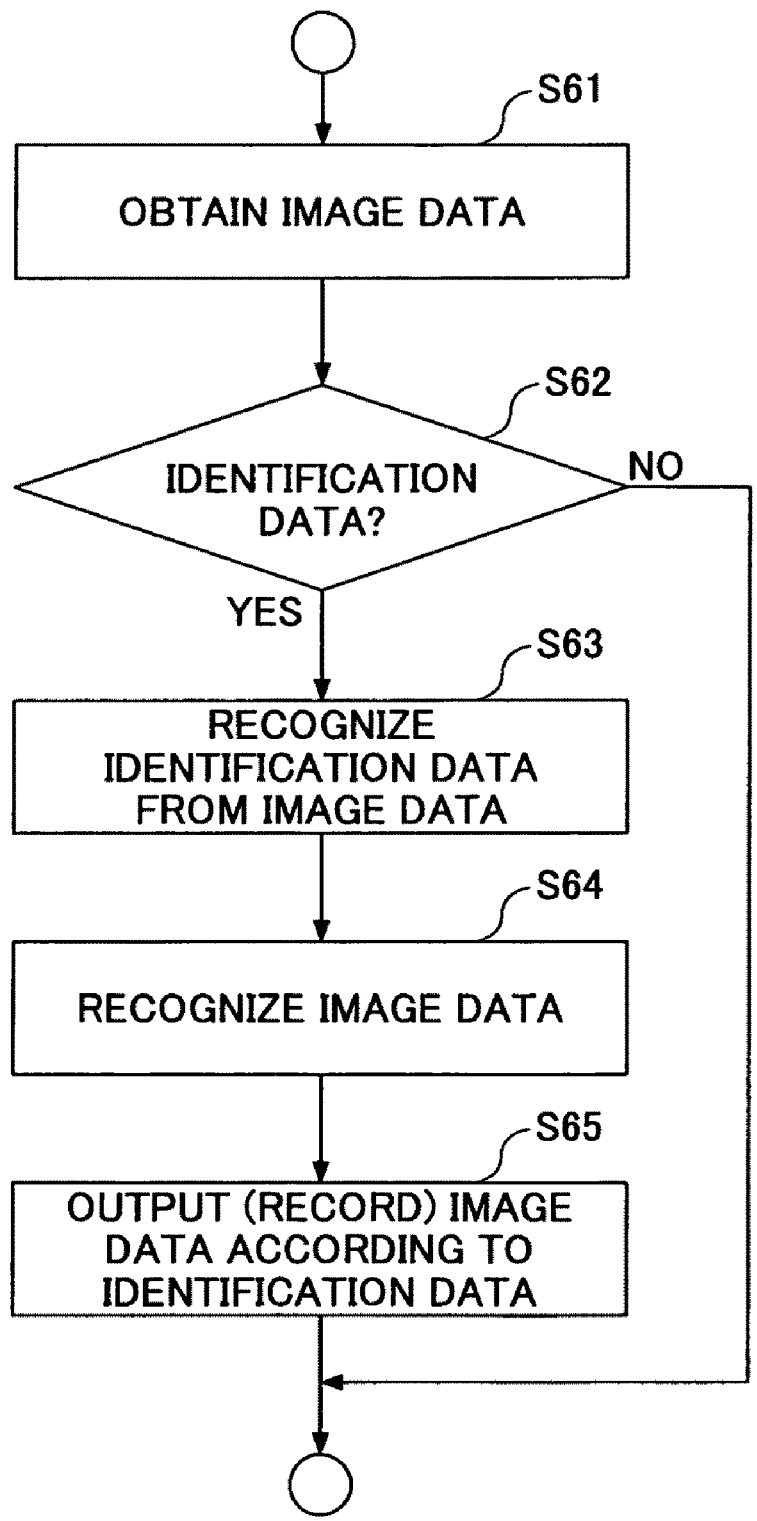
FIG. 23 is a flowchart showing an example of an operation of a multifunction peripheral of the third embodiment.

FIG. 23 is a flowchart showing an example of an operation of a multifunction peripheral of the third embodiment. Here, the block diagram of FIG. 22 is also referred to, to describe an example of an operation where the multifunction peripheral 2 outputs (or records) image data obtained by the image reading apparatus 17 and the like.

First, the image data obtaining unit 101 obtains image data (S61). Here, image data read by the image reading apparatus 17, image data recorded in the external recording apparatus 14, the external media input-output apparatus 15, or the recording apparatus 105, image data received from an external apparatus connected through the Internet 22, image data based on facsimile data received from another facsimile apparatus through the FAX line 21, and the like are obtained. FIG. 24 shows an example of image data to be obtained. The image data used in the first embodiment are image data such as a QR code recording a two-dimensional code in a predetermined position, as shown in FIG. 24.

The operation proceeds to step S62, in which the identification data recognizing unit 103 determines whether the image data obtained in step S61 include identification data (S62). The identification data are data used for the identification in a computer, such as an output file name (or a stored file name), as described above. Here, predetermined text included in the QR code shown in FIG. 24 corresponds to identification data.

When there are identification data included in the image data (S62, YES), the operation proceeds to step S63, in which the identification data recognizing unit 103 recognizes the identification data from the image data (S63). Here, the predetermined text included in the QR code shown in FIG. 24 is recognized. When the identification data are not included in the image data (S62, NO), the operation ends here.

Figure 25A:
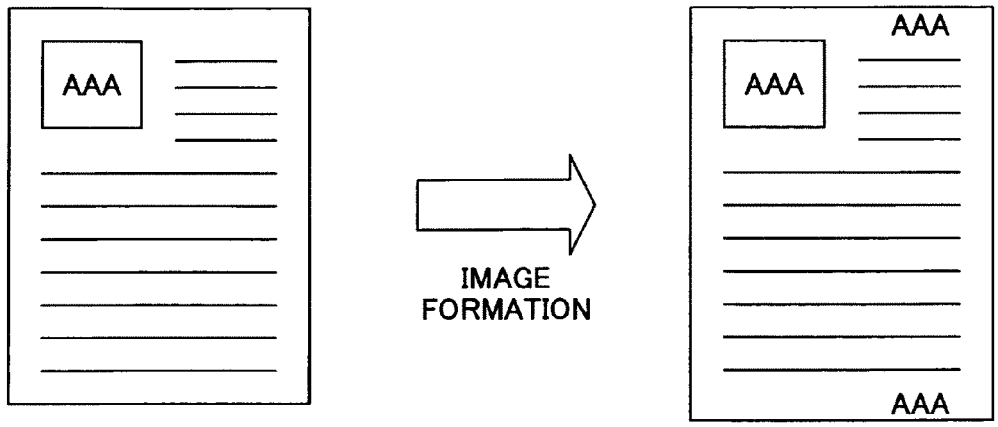
FIGS. 25A to 25C are diagrams for describing a process for outputting or recording obtained image data according to identification data.
Figure 25B:
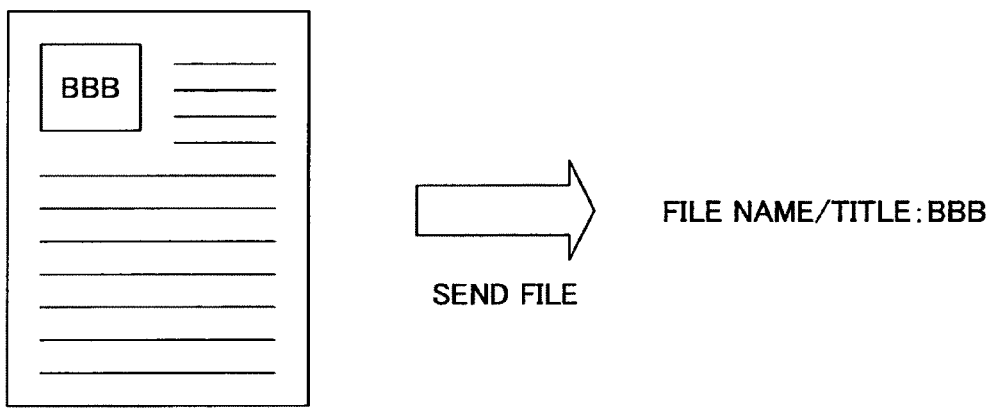
Figure 25C:
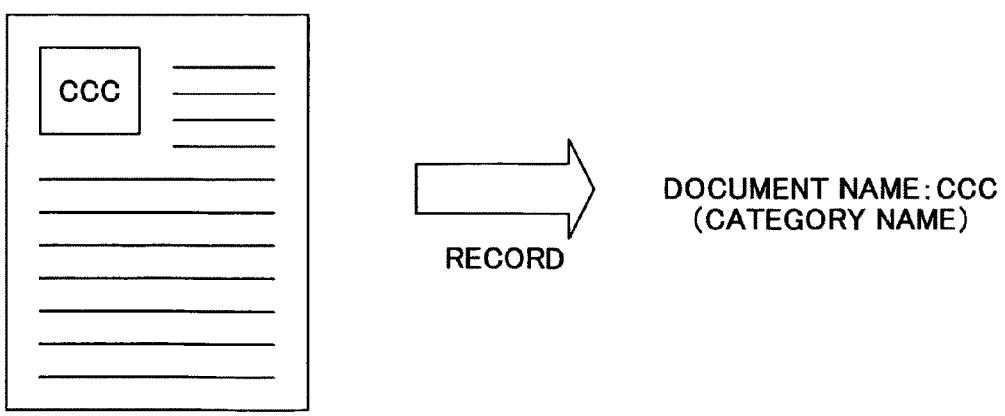

The operation proceeds to step S64, in which the image data recognizing unit 102 recognizes the image data (S64) obtained in step S61. Here, the image data shown in FIG. 24 are recognized. Subsequently, the operation proceeds to step S65, in which the output control unit 104 outputs (or records) the image data (S65) recognized in step S24 according to the identification data recognized in step S63. FIGS. 25A through 25C are diagrams for describing processes to output or record the image data according to the identification data.

In step S65, for example, the predetermined text recognized in step S63 is additionally provided as header data for the image data, and thereby the image is formed on a recording medium by the printing apparatus 16 (see FIG. 25A).

Alternatively, for example, the output control unit 104 performs an output operation by additionally providing identification data in a file name or a title of an electronic file generated based on the image data and sending the electronic file as a facsimile to another facsimile apparatus through the FAX line 21, or sending the electronic file to an external apparatus connected through the Internet 22, and the like (see FIG. 25B). Moreover, identification data are additionally provided in a file name (including a document name, a category name, and the like) of an electronic file generated based on the image data, and thus the electronic file is recorded in the recording apparatus 105 and the like (see FIG. 25C).

By the above-described processes, the multifunction peripheral 2 identifies the image data obtained by the image reading apparatus 17 and the like according to the identification data included in the image data to output (or record) the image data. Therefore, the identification data of the image data can be effectively set by recording an output file name (or a stored file name) in a two-dimensional code such as a QR code in advance as shown in FIG. 24 when the image data are outputted (or recorded).

[Fourth Embodiment]

A fourth embodiment of the present invention is described with reference to FIGS. 26 through 29. Here, the network synchronization efficiency of the system of network synchronizing described in the first embodiment is enhanced. Specifically, the plural multifunction peripherals 2 release the respective synchronization common folders in the network synchronizing system 1 so that the workload is shared and the synchronization speed is improved.

In the description of "network synchronization setting" of the first embodiment, "YES" is set in "release synchronization common folder (YES or NO)" in only the predetermined multifunction peripheral 2 that constitutes the network synchronizing system 1. Moreover, when "YES" is set in the setting of "release synchronization common folder" in the multifunction peripheral 2, the synchronization common folder of the multifunction peripheral 2 is released to other multifunction peripherals, therefore, a network path is not required to be set. Thus, this setting is disabled. On the other hand, when "NO" is set, the setting of the network path is enabled in the first embodiment.

In the fourth embodiment, however, the setting of the network path is enabled in the case where "YES" is set in the setting of "release synchronization common folder" in the multifunction peripheral 2, as described below. Accordingly, the multifunction peripheral 2 can perform an operation (first operation) to synchronize setting data between a setting data unit and a released synchronization common folder of the multifunction peripheral 2, and an operation (second operation) to synchronize setting data between the setting data unit of the multifunction peripheral 2 and a released synchronization common folder of another multifunction peripheral. In this manner, the network synchronization according to the present invention can be layered (hierarchized), so that the workload on the multifunction peripheral caused by the synchronizing process can be shared, and the speed for synchronizing all the multifunction peripherals 2 can be improved. When there are more multifunction peripherals 2, this effect becomes more remarkable. Further, logically, the number of network synchronizations (the number of multifunction peripherals) can be unlimited.

Below, the description is made by referencing the system of network synchronization described in the first embodiment. For the ease of comprehension, however, in view of enhancing the network synchronization efficiency of the fourth embodiment, the following description can be applied to the network synchronizing systems of the second and third embodiments as well.

(System Configuration Example)

A configuration of a network synchronizing system of the fourth embodiment is approximately similar to the network synchronizing system (see FIG. 1) of the first embodiment, however, multifunction peripherals 2e, 2f, and 2g (not shown) are additionally connected in the network for the convenience of description.

(Configuration Example of Functions Related to Network Synchronization of Setting Data)

A configuration example of functions of the multifunction peripheral 2 of the fourth embodiment is similar to the block diagram (see FIG. 2 or 6) as the configuration example of the functions of the multifunction peripheral of the first embodiment, therefore, a description thereof is omitted here.

(Release of Synchronization Common Folder and Network Path of Multifunction Peripheral)

FIG. 26 is a diagram showing an example of releasing of a synchronization common folder and setting data of a network path of the multifunction peripheral 2. As described in the first embodiment (see FIG. 5) as well, "release synchronization common folder (YES or NO)" is a setting item for setting whether a synchronization common folder of the multifunction peripheral 2 is released to outside, while "network path" is a setting item related to a location of a synchronization common folder of another multifunction peripheral. In view of this, FIG. 26 shows a list of setting data related to releasing (YES or NO) the synchronization common folders and setting data of the network paths of the multifunction peripherals 2a, 2b, 2c, 2d, 2e, 2f, and 2g (7 multifunction peripherals in total) that constitute the network synchronizing system of the fourth embodiment. Note that "synchronization common folder address (path)" shows addresses (paths) of the synchronization common folders of the respective multifunction peripherals.

In particular, in the multifunction peripheral 2a (and multifunction peripheral 2c), "YES" is set as "release synchronization common folder (YES or NO)", and "/2b/***" is set as "network path". By these settings, the synchronization common folder of the multifunction peripheral 2a is released. Therefore, multifunction peripherals (in this case, the multifunction peripherals 2d and 2e) that are different from the multifunction peripheral 2a can access the synchronization common folder of the multifunction peripheral 2a. Further, the multifunction peripheral 2a specifies a location of the synchronization common folder of another multifunction peripheral (in this case, the multifunction peripheral 2b) to be connected, by using the set network path. Since the synchronization common folder of the multifunction peripheral 2b is also released, the multifunction peripheral 2a can access the synchronization common folder of the multifunction peripheral 2b as well.

Figure 27:
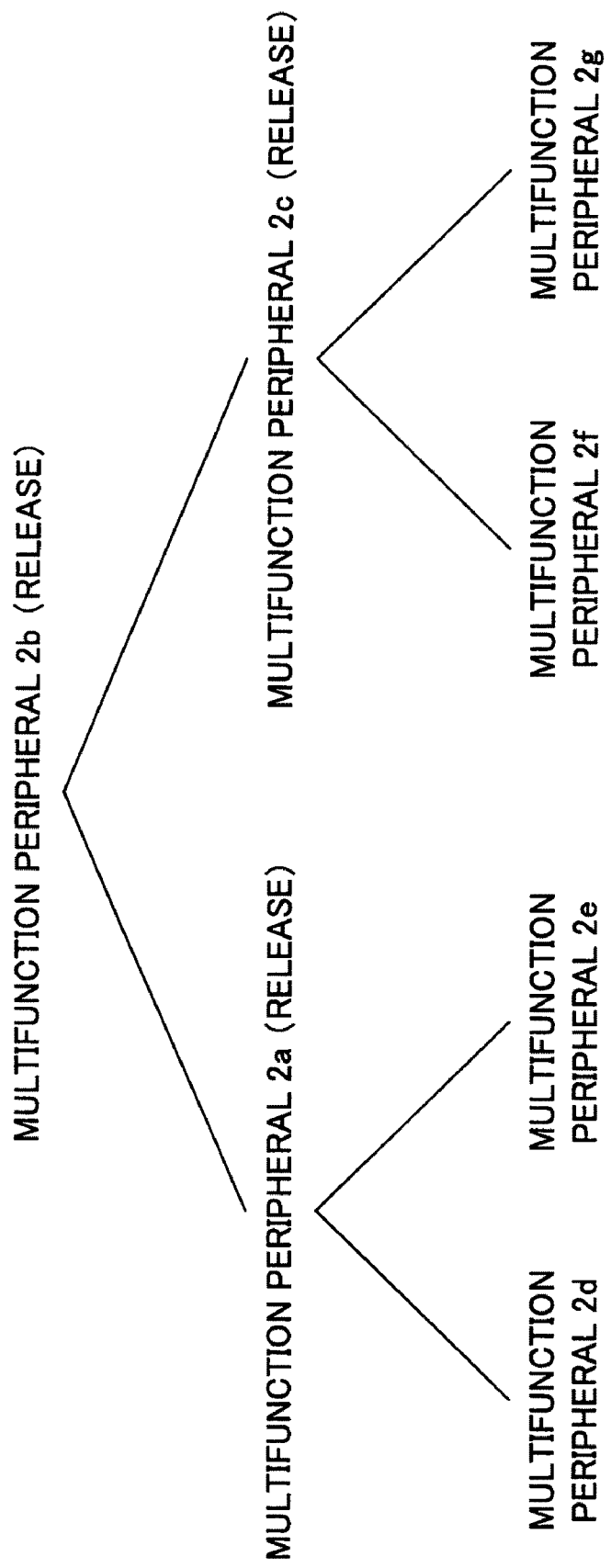
FIG. 27 is a diagram showing a tree configuration of a relationship related to network synchronization of a multifunction peripheral 2.

FIG. 27 is a diagram showing a tree configuration of a relationship related to the network synchronization of the multifunction peripheral 2. Specifically, a relationship among the multifunction peripherals 2a, 2b, 2c, 2d, 2e, 2f, and 2g shown in FIG. 26 is shown, based on the settings as to releasing of the synchronization common folders and the network paths. It is seen that the multifunction peripheral 2a (multifunction peripheral 2c) performs synchronization in itself (first operation) and also with the multifunction peripheral 2b (second operation).

(Example of Synchronization Setting Data for Network Synchronization)

FIG. 28 is a diagram showing an example of synchronization setting data for the network synchronization. Specifically, the synchronization setting data of the multifunction peripheral 2a, which are recorded in the synchronization setting data unit 230, are shown. As described above, the. synchronization control unit 240 of the multifunction peripheral 2a performs various controls related to the network synchronization based on the synchronization setting data. It is to be understood here that "YES" is set as "release synchronization common folder (YES or NO)" and "/2b/***" is set as "network path".

(Network Synchronizing Operation)

Next, in the network synchronizing operation, the multifunction peripheral 2a of the fourth embodiment performs synchronization (first operation) in itself and synchronization (second operation) with the multifunction peripheral 2b as well by the above synchronization setting data. Note that details of the processing operations are similar to those in the first embodiment, and therefore, a description thereof is omitted here. The first operation corresponds to the operation performed by the multifunction peripheral 2b in the first embodiment (see FIGS. 9 and 10). The second operation corresponds to the operation performed by the multifunction peripheral 2a in the first embodiment (see FIGS. 11 and 12).

Here, timings to perform the first and second operations (synchronization interval) can be set as required, however, it is preferable that one of the first and second operations be performed at one synchronization timing, instead of performing the first and second operations at the same time when the synchronization timing has come. For example, synchronization of the first operation (synchronization with a released folder in the multifunction peripheral 2b) is performed first, and then synchronization of the second operation (synchronization with a folder to be synchronized) is performed at a next synchronization timing. By performing one synchronizing operation at one time, the workload applied to the multifunction peripheral 2 that performs the first and second operations and the workload applied to the multifunction peripheral 2 that performs the first or second operation can be made the same. When both operations are performed at the same timing, less time is required to reflect the setting data to all the multifunction peripherals 2. However, in view of reducing the workload applied to the multifunction peripheral 2 that performs both operations, the first and second operations are alternately performed to reduce the workload required in one process, and the synchronization interval is reduced to half to reduce the time required for the synchronization to be reflected.

According to the network synchronizing system 1 and the multifunction peripheral 2 of the fourth embodiment described above, synchronization between the multifunction peripheral 2 and another multifunction peripheral connected through a network can be performed without using an apparatus such as a server apparatus. This is realized because the multifunction peripherals 2 always keep the latest setting data in the respective synchronization common folders, which are released in the network. Further, synchronization can be appropriately performed after associating (linking) the setting data of the identical users to each other, which are managed independently in the different multifunction peripherals 2.

Further, since a multifunction peripheral can perform the first operation and the second operation in itself, the network synchronization according to the present invention can be layered (hierarchized), the workload applied to the multifunction peripheral caused by the synchronization process can be shared, and the speed for synchronizing all the multifunction peripherals 2 can be improved. When there are more multifunction peripherals 2, this effect becomes more remarkable. Further, the number of network synchronizations (the number of multifunction peripherals) can be logically unlimited.

Specifically, when only one multifunction peripheral 2 releases a synchronization common folder in the network synchronizing system 1, all the other multifunction peripherals 2 perform synchronization with this multifunction peripheral. However, only one multifunction peripheral can perform synchronization with the synchronization common folder (exclusive control), therefore, the other multifunction peripherals 2 that require synchronization sequentially perform synchronization with the one synchronization common folder. Therefore, when the multifunction peripherals 2 to be synchronized are increased, it takes time until the synchronizations of all the multifunction peripherals 2 are completed.

In such a case, according to the network synchronizing system 1 and the multifunction peripheral 2 of the fourth embodiment, the multifunction peripheral 2 can perform both the first and second operations. Therefore, the other multifunction peripherals 2 that require synchronization perform synchronization with the synchronization common folder by distributing the synchronization to the plural multifunction peripherals 2. As a result, less time is required to complete the synchronizations of all the multifunction peripherals 2. Further, a process related to the synchronization, which is performed by the multifunction peripheral 2 releasing the synchronization common folder, can be reduced as well. Furthermore, improvement of original processes (such as copying and printing) of the multifunction peripheral 2 can also be expected.

(Deformation Example of Network Synchronizing Operation (Synchronization Setting Data))

FIG. 29 is a diagram showing an example of synchronization setting data according to a deformation example for the network synchronization. In this deformation example, synchronization setting data of the multifunction peripheral 2a are shown. The synchronization setting data here can be set so that they can be synchronized with the synchronization common folders of the plural multifunction peripherals 2. In a plural synchronization setting, when "YES" is set in "synchronize with plural synchronization common folders (YES or NO)", the multifunction peripheral 2a can perform synchronization (second operation) with a synchronization common folder of another multifunction peripheral 2 (multifunction peripheral 2c) in addition. Specifically, with the above setting, the multifunction peripheral 2a performs synchronization (second operation) with multifunction peripherals indicated by network paths of "/2b/*" and "/2c/*".

As described above, according to this deformation example, the multifunction peripheral 2 can perform synchronization with plural synchronization common folders. Therefore, flexibility of layering (designing) the network synchronization of the present invention is enhanced, the workload on the multifunction peripherals caused by the synchronizing process is distributed, and the speed for synchronizing all the multifunction peripherals 2 can be improved.

Note that this deformation example shows synchronization setting data of the multifunction peripheral 2a. However, for example, when there are many multifunction peripherals 2 which are configured in many (deep) layers (trees), it is effective to arrange that a multifunction peripheral 2 in a lower layer performs synchronization with a synchronization common folder of the closest (one layer above) multifunction peripheral 2 and at the same time performs synchronization with a synchronization common folder of a multifunction peripheral 2 located in a different (another) layer (line).

Further, as in the third deformation example of the network synchronizing operation of the first embodiment, the released synchronization common recording unit of the multifunction peripheral 2b can be provided outside the multifunction peripheral 2b. Therefore, a network path indicating the location of the synchronization common recording unit is required. In this manner, when the synchronization common recording unit is provided outside the multifunction peripheral, there are advantages in that the synchronization common recording unit can be easily replaced (for example, when a new product superior in capacity or access speed is manufactured), a workload is not applied to a recording unit in the multifunction peripheral, and the like.

Note that a method, an apparatus, a system, a computer program, a recording medium, and the like, to which the components or expressions of the present invention or an arbitrary combination of the components of the present invention are applied, are effective as a mode of the present invention.

According to one embodiment of the present invention, a network synchronizing system and an information processing apparatus, which realize synchronization of setting data effectively between plural information processing apparatuses, can be provided.

Although the invention has been described with respect to specific embodiments for a complete and clear disclosure, the present invention is not limited to these embodiments, such as the combinations with other components described in the embodiments, but variations and modifications may be made according to applications without departing from the scope of the present invention.

This patent application is based on Japanese Priority Patent Application No. 2008-070381 filed on Mar. 18, 2008, and Japanese Priority Patent Application No. 2008-277110 filed on Oct. 28, 2008, the entire contents of which are hereby incorporated herein by reference.

What is claimed is:

1. A network synchronizing system including a plurality of information processing apparatuses, the system comprising:
   a first information processing apparatus including,
      a first synchronization common recording unit configured to record personal setting data of one or more registered users who can use the first information processing apparatus so as to share the personal setting data with one or more other information processing apparatuses of the plurality of information processing apparatuses,
      a first setting data unit configured to record personal setting data of one or more registered users who can use the first information processing apparatus, and
      a first synchronization control unit configured to compare the personal setting data of said one or more users recorded in the first setting data unit and the personal setting data of said one or more users recorded in the first synchronization common recording unit and update the personal setting data of said one or more users recorded in the first setting data unit or the first synchronization common recording unit with the latest personal setting data for each user; and
   a second information processing apparatus including,
      a second setting data unit configured to record personal setting data of one or more registered users who can use the second information processing apparatus, and
      a second synchronization control unit configured to,
         compare the personal setting data of said one or more users recorded in the second setting data unit and the personal setting data of said one or more users recorded in the first synchronization common recording unit,
         update the personal setting data of said one or more users recorded in the second setting data unit or the first synchronization common recording unit with the latest personal setting data for each user, and
         determine if a user having personal setting data recorded in the second setting data unit and a user having personal setting data recorded in the first synchronization common recording unit are the same user if data uniquely provided for the user in the personal setting data of the user recorded in the second setting data unit and data uniquely provided for the user in the personal setting data of the user recorded in the first synchronization common recording unit are the same.

2. The network synchronizing system as claimed in claim 1, wherein the second information processing apparatus further includes a table configured to manage association between the personal setting data recorded in the second setting data unit and the personal setting data recorded in the first synchronization common recording unit, of the users determined to be the same user by the second synchronization control unit.

3. The network synchronizing system as claimed in claim 2, wherein when the second information processing apparatus receives a request to log in by a user registered in the first information processing apparatus, the second information processing apparatus permits the user to log in to the second information processing apparatus based on personal setting data of a user registered in the second information processing apparatus who is associated with the user registered in the first information processing apparatus in the table.

4. The network synchronizing system as claimed in claim 1, wherein the second information processing apparatus further includes a second synchronization common recording unit configured to record the personal setting data of one or more registered users who can use the second information processing apparatus, which are recorded in the first setting data unit, so as to share the personal setting data between the second information processing apparatus and one or more of other information processing apparatuses of the plural information processing apparatuses, the network synchronizing system, further comprising:
   a third information processing apparatus including,
      a third setting data unit configured to record personal setting data of one or more registered users who can use the third information processing apparatus, and
      a third synchronization control unit configured to,
         compare the personal setting data of said one or more users recorded in the second setting data unit and the personal setting data of said one or more users recorded in the second synchronization common recording unit,
         update the personal setting data of said one or more users recorded in the second setting data unit or the second synchronization common recording unit with the latest personal setting data for each user, and
         determine if a user having personal setting data recorded in the third setting data unit and a user having personal setting data recorded in the second synchronization common recording unit to be the same user, when data uniquely provided for the user in the personal setting data of the user recorded in the third setting data unit and data uniquely provided for the user in the personal setting data of the user recorded in the second synchronization common recording unit are the same.

5. The network synchronizing system as claimed in claim 4, wherein the second information processing apparatus performs a synchronizing operation by the second synchronization control unit and a synchronizing operation by the second synchronization common recording unit alternately at a fixed interval.

6. The network synchronizing system as claimed in claim 4, wherein the second information processing apparatus further includes a table configured to manage association between the personal setting data recorded in the second setting data unit and the personal setting data recorded in the second synchronization common recording unit, of the users determined to be the same user by the second synchronization control unit.

7. The network synchronizing system as claimed in claim 6, wherein when the third information processing apparatus receives a request to log in by a user registered in the first or second information processing apparatus, the third information processing apparatus permits the user to log in to the third information processing apparatus based on personal setting data of a user registered in the third information processing apparatus who is associated with the user registered in the first or second information processing apparatus in the table.

8. The network synchronizing system as claimed in claim 1, wherein the data uniquely provided for the user are a user name, biometric data, or IC card data of the user.

9. The network synchronizing system as claimed in claim 1, wherein the first synchronization control unit is configured to determine if a user having personal setting data recorded in the first setting data unit and a user having personal setting data recorded in the first synchronization common recording unit are the same user if data uniquely provided for the user in the personal setting data of the user recorded in the first setting data unit and data uniquely provided for the user in the personal setting data of the user recorded in the first synchronization common recording unit are the same.

10. The network synchronizing system as claimed in claim 1, wherein the first information processing apparatus is a recording apparatus.

\* \* \* \* \*